(12) United States Patent
Wu et al.

(10) Patent No.: US 12,287,060 B2
(45) Date of Patent: Apr. 29, 2025

(54) FOLDABLE HOLDER AND ELECTRONIC DEVICE

(71) Applicant: HONOR DEVICE CO., LTD., Shenzhen (CN)

(72) Inventors: Ling Wu, Shenzhen (CN); Guoliang Huo, Shenzhen (CN); Feng Tang, Shenzhen (CN); Desen Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/027,733

(22) PCT Filed: Sep. 7, 2022

(86) PCT No.: PCT/CN2022/117536
§ 371 (c)(1),
(2) Date: Mar. 22, 2023

(87) PCT Pub. No.: WO2023/103494
PCT Pub. Date: Jun. 15, 2023

(65) Prior Publication Data
US 2024/0183487 A1    Jun. 6, 2024

(30) Foreign Application Priority Data

Dec. 6, 2021 (CN) .......................... 202111478155.2

(51) Int. Cl.
*F16M 11/38* (2006.01)
*F16C 11/10* (2006.01)
*G06F 1/16* (2006.01)

(52) U.S. Cl.
CPC ............. *F16M 11/38* (2013.01); *F16C 11/10* (2013.01); *G06F 1/1616* (2013.01)

(58) Field of Classification Search
CPC ...... F16M 11/38; F16M 11/041; F16M 11/06; F16M 11/2007; F16M 2200/024;
(Continued)

(56) References Cited

U.S. PATENT DOCUMENTS 6,999,008 B2 * 2/2006 Wang .................... G06F 3/0231
345/169
7,148,874 B2 * 12/2006 Anzai .................... F16M 11/10
345/905

(Continued)

FOREIGN PATENT DOCUMENTS

| CN | 102720933 A | 10/2012 |
| CN | 104216475 A | 12/2014 |

(Continued)

*Primary Examiner* — Lisa Lea-Edmonds
(74) *Attorney, Agent, or Firm* — WOMBLE BOND DICKINSON (US) LLP

(57) ABSTRACT

The application provides a foldable holder and an electronic device. A bottom plate of the foldable holder is rotationally connected to a first support plate through a first rotating portion, and a second support plate is rotationally connected to the first support plate through a second rotating portion. A clamping portion is mounted on the first support plate and slidable relative to the first support plate. When the foldable holder is in a closed state, the clamping portion clamps the second rotating portion to lock the first support plate and the second support plate, when the first support plate is at an angle to the bottom plate, the clamping portion is unlocked from the second rotating portion and clamped with the first rotating portion, the unlocking of the second rotating portion enables the second support plate to rotate relative to the first support plate.

20 Claims, 12 Drawing Sheets

(58) Field of Classification Search
CPC ............... F16M 13/00; F16M 13/005; F16M 2200/021; F16M 2200/022; F16C 11/10; F16C 11/04; F16C 11/12; G06F 1/1616; G06F 3/0227; G06F 3/0202
See application file for complete search history.

(56) References Cited

U.S. PATENT DOCUMENTS

| | | | | |
|---|---|---|---|---|
| 7,479,902 | B2* | 1/2009 | Wang | G06F 1/1632 |
| | | | | 345/169 |
| 8,714,510 | B2* | 5/2014 | McCosh | H04M 1/04 |
| | | | | 248/459 |
| 9,194,536 | B2* | 11/2015 | Kim | G06F 1/16 |
| 9,249,922 | B2* | 2/2016 | Haarburger | A47B 23/042 |
| 9,271,409 | B2 | 2/2016 | Liang et al. | |
| 9,872,560 | B2* | 1/2018 | McGrane | A47B 23/04 |
| 10,386,893 | B2 | 8/2019 | Kim et al. | |
| 11,050,453 | B2* | 6/2021 | Jackson | H04M 1/04 |
| 11,132,019 | B1* | 9/2021 | Cho | F16M 11/24 |
| 11,359,761 | B2* | 6/2022 | Liu | F16M 11/10 |
| 12,000,530 | B2* | 6/2024 | Zabelin | G06F 1/1601 |
| 2001/0055196 | A1 | 12/2001 | Anzai et al. | |
| 2004/0007649 | A1* | 1/2004 | Vettraino | F16M 13/00 |
| | | | | 248/127 |
| 2012/0211613 | A1* | 8/2012 | Yang | A45C 13/34 |
| | | | | 248/174 |
| 2013/0009024 | A1 | 1/2013 | Liu | |
| 2013/0175423 | A1* | 7/2013 | Coberly | F16M 11/2035 |
| | | | | 160/220 |
| 2016/0023087 | A1 | 1/2016 | Corrales et al. | |
| 2019/0038018 | A1* | 2/2019 | Hill | F16B 2/12 |
| 2020/0060420 | A1* | 2/2020 | Hu | A47B 23/043 |
| 2020/0208773 | A1 | 7/2020 | Lin | |
| 2021/0247016 | A1* | 8/2021 | Affentranger | A47B 23/044 |
| 2023/0049295 | A1 | 2/2023 | Hillyerd | |
| 2024/0183487 | A1* | 6/2024 | Wu | F16M 11/06 |
| 2024/0344653 | A1* | 10/2024 | Wu | F16M 13/00 |

FOREIGN PATENT DOCUMENTS

| | | |
|---|---|---|
| CN | 204554289 U | 8/2015 |
| CN | 205101793 U | 3/2016 |
| CN | 103186181 B | 3/2017 |
| CN | 108604109 A | 9/2018 |
| CN | 208204392 U | 12/2018 |
| CN | 209103592 U | 7/2019 |
| CN | 210624073 U | 5/2020 |
| CN | 210724887 U | 6/2020 |
| CN | 210920677 U | 7/2020 |
| CN | 212565035 U | 2/2021 |
| CN | 213428970 U | 6/2021 |
| CN | 214093653 U | 8/2021 |
| CN | 113898851 A | 1/2022 |
| JP | 2020043527 A | 3/2020 |
| TW | M469518 U | 1/2014 |
| WO | 2021145886 A1 | 7/2021 |

* cited by examiner

FOLDABLE HOLDER AND ELECTRONIC DEVICE

CROSS-REFERECNE TO RELATED APPLICATIONS

This application is a national stage of International Application No. PCT/CN2022/117536, filed on Sep. 7, 2022, which claims priority to Chinese Patent Application No. 202111478155.2, filed on Dec. 6, 2021. The disclosures of both of the aforementioned applications are hereby incorporated by reference in their entireties.

TECHNICAL FIELD

This application relates to the technical field of electronic device accessories, and in particular, to a foldable holder and an electronic device.

BACKGROUND

With the development of science and technology, electronic devices such as tablet computers and mobile phones are favored by more people due to their portability. A foldable holder is used for placing a tablet computer or a mobile phone, to facilitate people to use the tablet computer or the mobile phone more conveniently. The existing hinge-type foldable holder mainly relies on the difference in torque of the main and auxiliary rotating shafts to realize the opening and closing of the holder. However, during continuous opening and closing processes of the foldable holder, the torque of the rotating shafts is attenuated, which leads to abnormal opening and closing.

SUMMARY

The application provides a foldable holder and an electronic device, to resolve the problem of abnormal opening and closing of the foldable holder in the prior art.

To resolve the foregoing problem, this application provides a foldable holder, including: a first support plate, a second support plate, a bottom plate, a first rotating portion, a second rotating portion, and a clamping portion. A bottom plate is rotationally connected to a first support plate through a first rotating portion, and a second support plate is rotationally connected to a side of the first support plate through a second rotating portion: and the first rotating portion and the second rotating portion are located on two opposite sides of the first support plate. A clamping portion is mounted on the first support plate and slidable relative to the first support plate.

When the foldable holder is in a closed state, the first support plate and the second support plate are side by side and both are stacked on the bottom plate, the clamping portion clamps the second rotating portion to lock the first support plate and the second support plate, and the first support plate and the second support plate are rotatable together relative to the bottom plate, so that the first support plate is arranged at an angle to the bottom plate, and the clamping portion is unlocked from the second rotating portion and clamped with the first rotating portion. The first support plate is located at an angle to the bottom plate, and an unlocked state of the second rotating portion enables the second support plate to rotate relative to the first support plate until the second support plate is arranged at an angle to the first support plate and the foldable holder is in an open state.

In this embodiment, when the clamping portion clamps the second rotating portion, the first support plate and the second support plate are limited and remain relatively stationary, and when the first support plate or the second support plate is rotated, the first support plate and the second support plate are rotatable together relative to the bottom plate: and when the clamping portion clamps the first rotating portion, the first support plate and the bottom plate are limited and remain relatively stationary, and when the second support plate is rotated, the second support plate is rotatable relative to the first support plate. The clamping portion is arranged to clamp and fix the first rotating portion or the second rotating portion, so that it can be ensured that opening and closing logic of the foldable holder is normal and improve user experience.

In an implementation, a surface of the first support plate facing away from the bottom plate is an outer surface, the second rotating portion is unlocked, the second support plate is reciprocally rotatable relative to the first support plate through the second rotating portion, the second support plate and the first support plate are located at a support angle, and the support angle is an angle between the second support plate and the outer surface.

In this embodiment, the second support plate is rotated to drive the second rotating portion to rotate relative to the first support plate, to adjust the support angle. When a mobile terminal is located on the second support plate, a viewing angle of the user can be adjusted, thereby improving the user experience.

In an implementation, the clamping portion includes a clamping body and an elastic body: the clamping portion is mounted on the first support plate, the elastic body connects the clamping body and the first support plate, and the clamping body is slidable relative to the first support plate. When the foldable holder is in the closed state, the elastic body is in a pre-compressed state, and the elastic body tends to open elastically towards the first rotating portion.

In this embodiment, when the foldable holder is transformed from the closed state to the state of being arranged at an angle, the first support plate is rotated, so that the first support plate rotates relative to the bottom plate, the clamping body is subjected to a force towards the first rotating portion, and the clamping body slides towards the first rotating portion under an elongation effect of the elastic body, so that the clamping portion can clamp the first rotating portion.

In an implementation, the clamping portion includes two elastic bodies. The two elastic bodies are connected to two opposite sides of the clamping body, two ends of the clamping body face the first rotating portion and the second rotating portion respectively, and the elastic bodies are away from end portions of the clamping body and fixedly connected to the first support plate. A pre-compression resilience force of the elastic body enables the clamping body to slide along the first support plate towards the first rotating portion so that the clamping body is clamped with the first rotating portion, and the clamping body is slidable along the first support plate towards the second rotating portion, so that the clamping body is clamped with the second rotating portion and the elastic body is compressed when the clamping body slides.

In this embodiment, by rotating the clamping body relative to the first support plate, the clamping body can move towards the first rotating portion or towards the second rotating portion, to clamp the first rotating portion or the second rotating portion. In addition, an elastic force of the elastic body can drive the clamping body to move, and when the foldable holder is transformed from the closed state to the semi-unfolded state, the elastic body can drive the clamping body to move towards the first rotating portion, to clamp the first rotating portion.

In an implementation, the elastic body is a curved strip-shaped elastic sheet or a spring, and a length extension direction of the elastic body intersects with a sliding direction of the clamping body. In this embodiment, by setting the length extension direction of the elastic body to intersect with the sliding direction of the clamping body, space is saved.

In an implementation, the first rotating portion includes a first rotating shaft, the first rotating shaft is fixedly connected to the bottom plate and rotationally connected to the first support plate, the first support plate is rotatable around the first rotating shaft to drive the first support plate to rotate relative to the bottom plate, and when the clamping body is clamped with the first rotating shaft, the first support plate is located at an angle to the bottom plate.

In this embodiment, by setting the first rotating shaft, rotational connection between the bottom plate and the first support plate is realized through the first rotating shaft. The clamping portion can realize limitation between the first support plate and the bottom plate by directly clamping the first rotating shaft, thereby simplifying the structure of foldable holder.

In an implementation, the first rotating portion includes a locking member, the locking member is mounted on the first rotating shaft, and when the first support plate is arranged at an angle to the bottom plate, the locking member locks the first rotating shaft, to locate the first support plate and the bottom plate.

In an implementation, the second rotating portion includes a second rotating shaft, the second rotating shaft is fixedly connected to the second support plate and rotationally connected to the first support plate, and rotation of the second support plate drives the second rotating shaft to rotate relative to the first support plate, so that the second support plate rotates relative to the first support plate.

In this embodiment, by setting the second rotating shaft, rotational connection between the first support plate and the second support plate is realized through the second rotating shaft. The clamping portion can realize limitation between the first support plate and the second support plate by directly clamping the second rotating shaft, thereby further simplifying the structure of foldable holder.

In an implementation, the clamping body clamps the second rotating shaft, and the first support plate is rotatable around the first rotating shaft: and the clamping body clamps the first rotating shaft and releases the second rotating shaft, and the second support plate drives the second rotating shaft to rotate relative to the first support plate.

In this embodiment, when the foldable holder is in the closed state, the clamping body clamps the second rotating shaft, so that the first support plate and the second support plate are limited and remain relatively stationary. At the same time, when the first rotating shaft is unlocked and the first support plate or the second support plate is rotated, the first support plate can rotate around the first rotating shaft, so that the first support plate and the second support plate to rotate together relative to the bottom plate, to adjust an angle between the first support plate and the bottom plate. Therefore, the foldable holder can be smoothly transformed from the closed state to the semi-unfolded state.

In addition, the clamping body clamps the first rotating shaft, so that the first support plate and the bottom plate are limited and remain relatively stationary. At the same time, the second rotating shaft is unlocked, and the second support plate is rotated, to drive the second rotating portion to rotate relative to the first support plate, so that the second support plate can rotate relative to the first support plate, to adjust an angle between the first support plate and the second support plate. Therefore, the foldable holder can be smoothly transformed from the state of being arranged at an angle to the open state, or from the open state to the state of being arranged at an angle.

In an implementation, the first rotating shaft is provided with a first clamping groove, and the first clamping groove is opposite to an end of the clamping body facing the first rotating shaft: when the foldable holder is in the closed state, the end of the clamping body facing the first rotating shaft is staggered with the first clamping groove: and when the foldable holder is in the open state, or the first support plate is arranged at an angle to the bottom plate, the end of the clamping body facing the first rotating shaft is clamped with the first clamping groove.

In this embodiment, by arranging the first clamping groove on the first rotating shaft, when an end of the clamping body is located in the first clamping groove, the first rotating shaft can be clamped, to realize the limitation between the bottom plate and the first support plate. When the clamping body is disengaged from the first clamping groove, the first rotating shaft is unlocked, and the first support plate can rotate around the first rotating shaft, so that the first support plate rotates around the bottom plate.

In an implementation, the second rotating shaft is provided with a second clamping groove, and when the foldable holder is in the closed state, an end of the clamping body facing the second rotating shaft is clamped with the second clamping groove: and when the foldable holder is in the open state, or the first support plate is arranged at an angle to the bottom plate, the end of the clamping body facing the second rotating shaft is disengaged from the second clamping groove and the second rotating shaft is released.

In this embodiment, by arranging the second clamping groove on the second rotating shaft, when an end of the clamping body is located in the second clamping groove, the second rotating shaft can be clamped, to realize the limitation between the first support plate and the second support plate. When the clamping body is disengaged from the second clamping groove, the second rotating shaft is unlocked, rotation of the second support plate can drive the second rotating shaft to rotate around the first support plate, so that the second support plate rotates relative to the first support plate.

In an implementation, the first rotating portion includes a bump, and the bump is fixedly connected to the first rotating shaft and opposite to an end of the clamping body facing the first rotating shaft: when the foldable holder is in the closed state, the bump abuts against the clamping body: and when the foldable holder is in the open state, or the first support plate is arranged at an angle to the bottom plate, the bump is disengaged from the clamping body.

In this embodiment, by arranging the bump on the first rotating shaft and making the bump abut against the clamping body, the clamping body moves towards the second rotating shaft, to clamp the second rotating shaft. When the bump is disengaged from the clamping body, the clamping body moves away from the second rotating shaft, to unlock the second rotating shaft. In an implementation, the second rotating portion includes a hinge, and the hinge is connected between the first support plate and the second support plate and rotatable relative to the second rotating shaft: and when the first support plate is located at an angle to the bottom plate, the hinge supports the second support plate to the first support plate, to limit the second support plate to rotate towards the bottom plate.

In an implementation, the second rotating portion further includes a first fixing plate and a second fixing plate, the first fixing plate is fixedly connected to the first support plate, the second fixing plate is fixedly connected to the second support plate, the second rotating shaft is fixedly connected to the second fixing plate, and the first fixing plate is rotationally connected to the second rotating shaft. The second support plate drives the second rotating shaft to rotate relative to the first fixing plate, to drive the second fixing plate to rotate relative to the first fixing plate, to further drive the second support plate to rotate relative to the first support plate.

In this embodiment, by arranging the first fixing plate and the second fixing plate, and rotating the second fixing plate relative to the first fixing plate, the second support plate rotates relative to the first support plate, to improve stability of the second support plate rotating relative to the first support plate.

In an implementation, the foldable holder includes a locating member, the locating member is mounted on the second rotating portion, the clamping portion is clamped with the first rotating portion, and the locating member is used for locating the second support plate relative to the first support plate.

In this embodiment, when the second support plate rotates around the second rotating shaft until the foldable holder is in the open state, an angle between the second support plate and the first support plate is a second angle. The locating member locates the second support plate, to prevent the second support plate from continuing to rotate relative to the first support plate and to prevent the angle between the second support plate and the first support plate from being greater than the second angle. In addition, by arranging the locating member, the second support plate can also be fixed, to remain the foldable holder in the open state. When the second support plate rotates relative to the first support plate to be parallel to the first support plate, the locating member locates the second support plate, to prevent the second support plate from continuing to rotate around the second rotating shaft and to remain the second support plate and the first support plate in the parallel state.

In an implementation, the first support plate includes a surface, a mounting groove is recessed on the surface, the clamping portion is accommodated in the mounting groove, an end portion of the elastic body away from the clamping body is fixed with a groove side wall of the mounting groove, and the clamping body is slidable in the mounting groove to make the elastic body generate elastic deformation. In this embodiment, the thickness of the foldable holder can be reduced by accommodating the clamping portion in the mounting groove.

This application further provides an electronic device, including a mobile terminal and the foregoing foldable holder. The mobile terminal is mounted on a second support plate of the foldable holder.

In this embodiment, when the foldable holder is in an open state, it can support the body to facilitate use of a user. When the foldable holder is in a closed state, the volume of the electronic device is small to facilitate the user to carry, and the body is located between a bottom plate and a first support plate and a first support plate, and the foldable holder protects the body.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

The following describes the embodiments of this application with reference to the accompanying drawings in the embodiments of this application.

Figure 1:
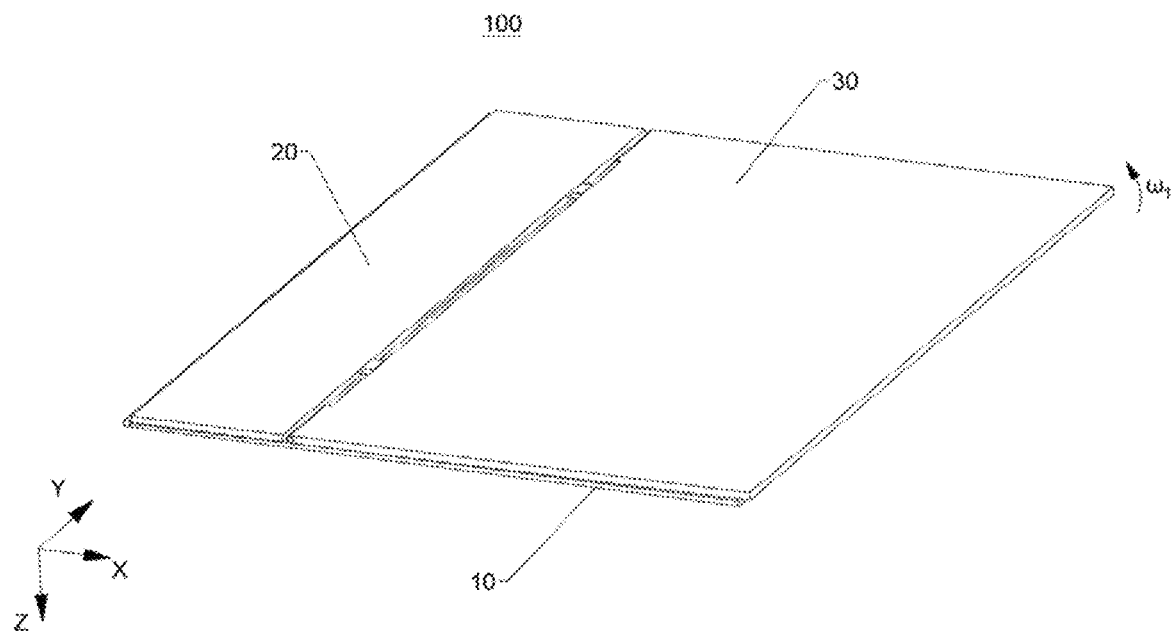
FIG. 1 is a schematic structural diagram of a foldable holder in a first state according to an embodiment of this application.
Figure 2:
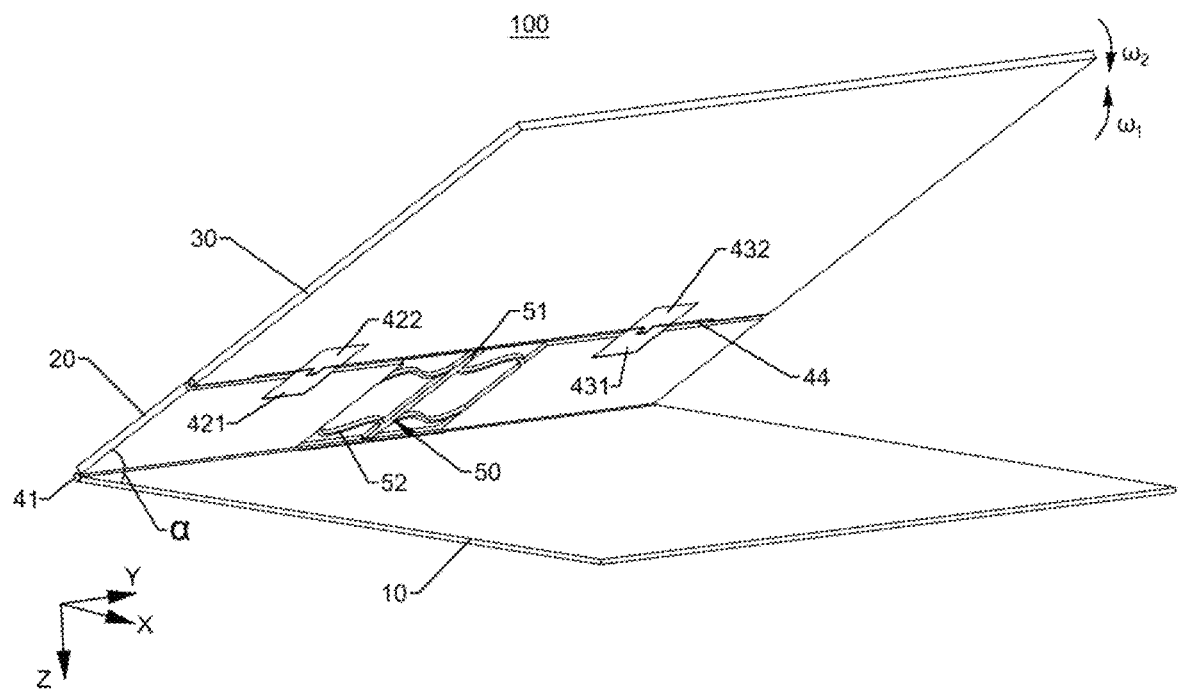
FIG. 2 is a schematic structural diagram of a foldable holder in a second state according to an embodiment of this application.
Figure 3:
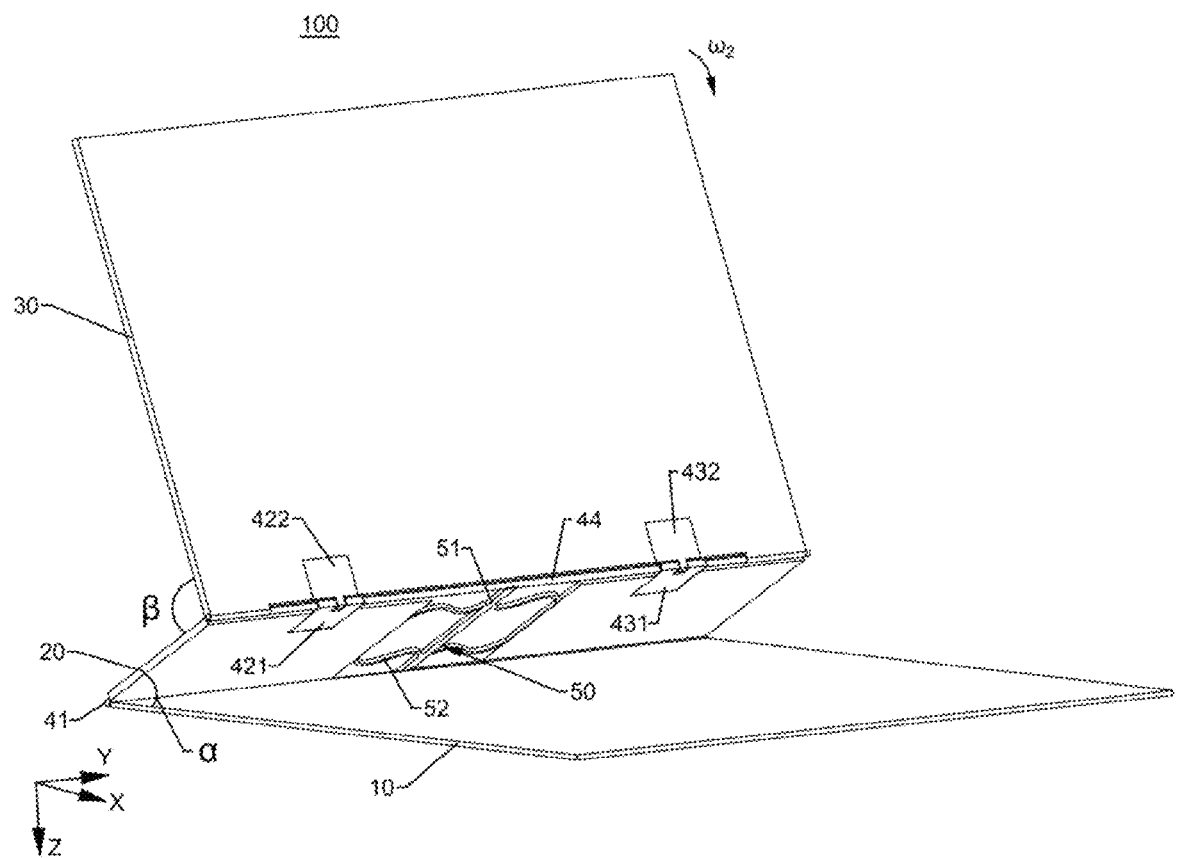
FIG. 3 is a schematic structural diagram of a foldable holder in a third state according to an embodiment of this application.

Referring to FIG. 1 to FIG. 3, FIG. 1 is a schematic structural diagram of a foldable holder 100 in a first state according to an embodiment of this application, FIG. 2 is a schematic structural diagram of a foldable holder 100 in a second state according to an embodiment of this application, and FIG. 3 is a schematic structural diagram of a foldable holder 100 in a third state according to an embodiment of this application.

For ease of description, a width direction of the foldable holder 100 is defined as an X direction, a length direction of the foldable holder 100 is defined as a Y direction, and a thickness direction of the foldable holder 100 is defined as a Z direction. The X direction, the Y direction, and the Z direction are perpendicular to each other.

The foldable holder 100 shown in FIG. 1 is in a closed state, the foldable holder 100 shown in FIG. 2 is in a semi-unfolded state, and the foldable holder 100 shown in FIG. 3 is in an open state.

The foldable holder 100 is used for carrying a tablet computer, a mobile phone, or other terminal devices. The first state is the closed state, the second state is the semi-unfolded state, and the third state is the open state.

The foldable holder 100 includes a first support plate 20, a second support plate 30, a bottom plate 10, a first rotating portion, a second rotating portion, and a clamping portion 50. A bottom plate 10 is rotationally connected to a first support plate 20 through a first rotating portion, and a second support plate 30 is rotationally connected to a side of the first support plate 20 through a second rotating portion: and the first rotating portion and the second rotating portion are located on two opposite sides of the first support plate 20. A clamping portion 50 is mounted on the first support plate 20 and slidable relative to the first support plate 20.

When the foldable holder 100 is in a closed state, the first support plate 20 and the second support plate 30 are side by side and both are stacked on the bottom plate 10, the clamping portion 50 clamps the second rotating portion to lock the first support plate 20 and the second support plate 30, the first support plate 20 and the second support plate 30 are rotatable relative to the bottom plate 10, so that in a process of the first support plate 20 being arranged at an angle to the bottom plate 10, the clamping portion 50 is unlocked from the second rotating portion until it is clamped with the first rotating portion, the first support plate 20 is located at an angle to the bottom plate 10, and the unlocking of the second rotating portion enables the second support plate 30 to rotate relative to the first support plate 20 until the second support plate 30 is arranged at an angle to the first support plate 20 and the foldable holder is in the open state.

It should be noted that "the state of being arranged at an angle" described herein is the semi-unfolded state, that is, the state shown in FIG. 2.

As shown in FIG. 1, when the foldable holder 100 is in the closed state, the first support plate 20 and the second support plate 30 are arranged side by side along the X direction, and both the first support plate 20 and the second support plate 30 are stacked with the bottom plate 10. When the foldable holder 100 is in the closed state, the volume is small, making it easy to store and carry, thereby increasing practicality of the foldable holder 100. As shown in FIG. 2, when the foldable holder 100 is in the semi-unfolded state, the first support plate 20 is parallel to the second support plate 30, and the bottom plate 10 is arranged at an angle to the first support plate 20. As shown in FIG. 3, when the foldable holder 100 is in the open state, the first support plate 20 is arranged at an angle to the second support plate 30, and the bottom plate 10 is arranged at an angle to the first support plate 20. When the foldable holder 100 is in the open state, the second support plate 30 may be used for placing a tablet computer, to facilitate use of a user.

Figure 4:
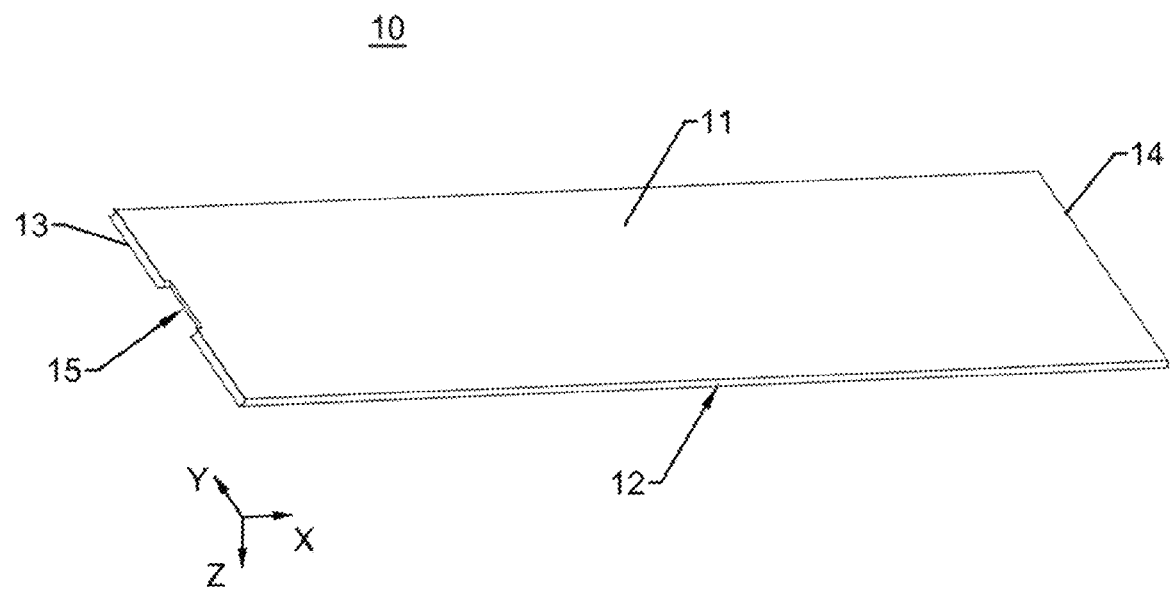
FIG. 4 is a schematic structural diagram of a bottom plate in the foldable holder shown in FIG. 1.

Referring to FIG. 4. FIG. 4 is a schematic structural diagram of a bottom plate 10 in the foldable holder 100 shown in FIG. 1.

In this embodiment, the bottom plate 10 is a rectangle. The bottom plate 10 includes an upper surface 11, a lower surface 12, a first side surface 13, and a second side surface 14. The upper surface 11 and the lower surface 12 are arranged opposite to each other, and both the upper surface 11 and the lower surface 12 are perpendicular to the thickness direction of the bottom plate 10, that is, both the upper surface 11 and the lower surface 12 are perpendicular to the Z direction. The first side surface 13 and the second side surface 14 are arranged opposite to each other, and length directions of both the first side surface 13 and the second side surface 14 are parallel to the Y direction. Both the first side surface 13 and the second side surface 14 are connected between the upper surface 11 and the lower surface 12. In this embodiment, the first side surface 13 is a curved surface, and the first side surface 13 is used for being fixedly connected to the first rotating portion. In some other embodiments, the first side surface 13 may also be a flat surface. The bottom plate 10 is provided with a first avoidance groove 15.

The first avoidance groove 15 is recessed in the first side surface 13. The first avoidance groove 15 runs through the upper surface 11 and the lower surface 12.

Figure 5:
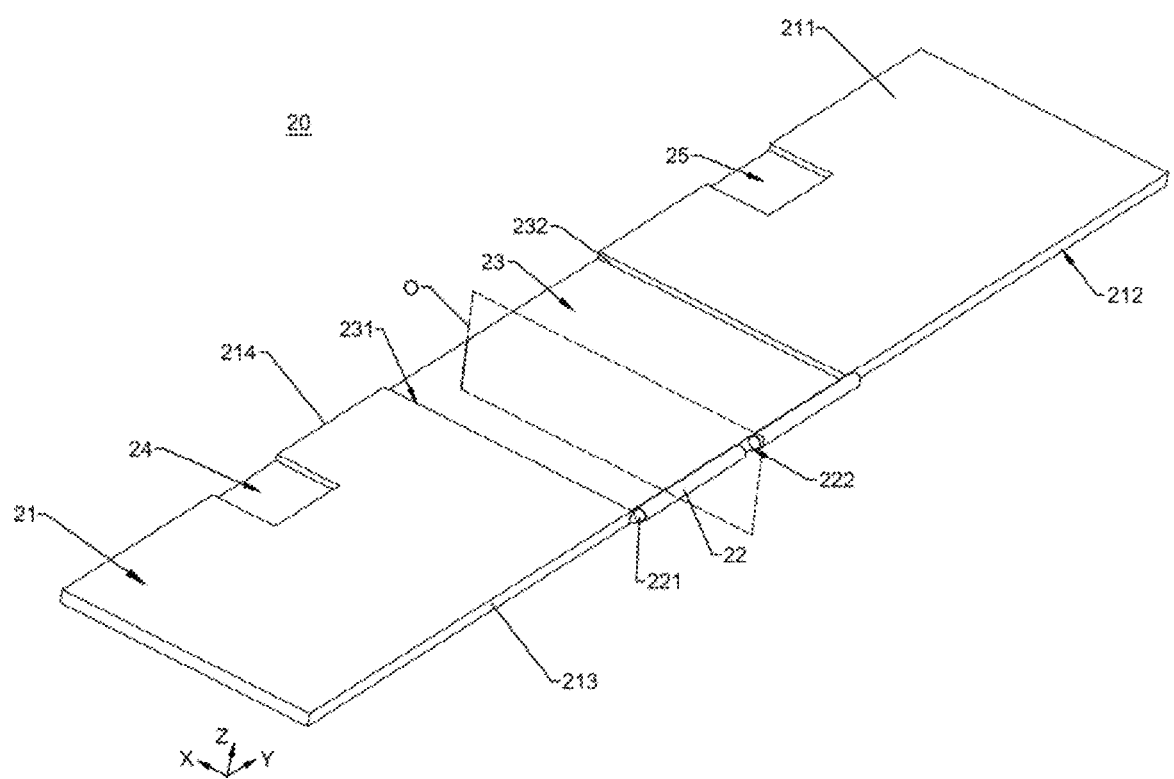
FIG. 5 is a schematic structural diagram of a first support plate in the foldable holder shown in FIG. 1.

Referring to FIG. 5, FIG. 5 is a schematic structural diagram of a first support plate 20) in the foldable holder 100 shown in FIG. 1.

The first support plate 20 includes a first body 21 and a first shaft sleeve 22. For ease of description, a first reference surface O is provided in this embodiment. The first reference surface O is parallel to the X direction and the Z direction, and the first support plate 20 is symmetrical about the first reference surface O. It should be noted that the first reference surface O does not actually exist.

The first body 21 is a rectangular thin plate, and a length of the first body 21 is equal to a length of the bottom plate 10. Certainly, a small deviation (within tolerance) can also be allowed for the length of the first body 21 and the bottom plate 10. That is, a size of the first support plate 20 in the Y direction is the same as a size of the bottom plate 10 in the Y direction. The first body 21 includes a first surface 211, a second surface 212, a third side surface 213, and a fourth side surface 214. The first surface 211 and the second surface 212 are arranged opposite to each other, and when the foldable holder 100 is in the closed state, both the first surface 211 and the second surface 212 are perpendicular to the Z direction. The third side surface 213 and the fourth side surface 214 are arranged opposite to each other, and length directions of both the third side surface 213 and the fourth side surface 214 are parallel to the Y direction. Both the third side surface 213 and the fourth side surface 214 are connected between the first surface 211 and the second surface 212.

The first surface 211 is recessed with a mounting groove 23, a first groove 24, and a second groove 25. The first groove 24 and the second groove 25 are located on two opposite sides of the mounting groove 23 and arranged at intervals with the mounting groove 23. The mounting groove 23 includes a first side wall 231 and a second side wall 232, where the first side wall 231 and the second side wall 232 are arranged opposite to each other, and both the first side wall 231 and the second side wall 232 are parallel to the X direction. The mounting groove 23 runs through the third side surface 213 and the fourth side surface 214 in the X direction. In this embodiment, the mounting groove 23 is arranged at a center of the first body 21 in the Y direction, and the mounting groove 23 is symmetrical about the first reference surface O. The mounting groove 23 is further provided with an opening running through the third side surface 213 and the fourth side surface 214, and the opening is located in the X direction and at two opposite ends of the first side wall 231 and the second side wall 232. The first groove 24 and the second groove 25 are provided at intervals along the Y direction, and symmetrically provided on two opposite sides of the mounting groove 23 in the Y direction. Both the first groove 24 and the second groove 25 are located at an end of the first surface 211 close to the fourth side surface 214, and run through the fourth side surface 214.

The first shaft sleeve 22 is a hollow cylinder. The first shaft sleeve 22 is provided with a first shaft hole 221, and the first shaft hole 221 runs through the first shaft sleeve 22 in the Y direction. The first shaft sleeve 22 is further provided with a second avoidance groove 222, the second avoidance groove 222 is located in a middle part of the first shaft sleeve 22, and the second avoidance groove 222 divides the first shaft sleeve 22 into two sub shaft sleeves at intervals. The first shaft sleeve 22 is fixedly connected to the third side surface 213, and located at the opening of the mounting groove 23 facing the third side surface 213, the first shaft sleeve 22 is symmetrical about the first reference surface O, and a length direction of an axis of the first shaft hole 221 is parallel to a length direction of the third side surface 213. In this embodiment, the length of the first shaft sleeve 22 is the same as a size of the mounting groove 23 in the Y direction. Certainly, in some other embodiments, the length of the first shaft sleeve 22 may be slightly less than the size of the mounting groove 23 in the Y direction. The first shaft sleeve 22 is used for rotational connection of the first rotating portion. The second avoidance groove 222 is used for avoiding the clamping portion 50, so that the clamping portion 50 runs through the second avoidance groove 222 to clamp the first rotating portion connected to the bottom plate 10.

In this embodiment, the first shaft sleeve 22 and the first body 21 are integrally formed to ensure structural stability of the first support plate 20. In some other embodiments, the first shaft sleeve 22 and the first body 21 may also be fixedly connected by welding, screwing or bonding.

Figure 6:
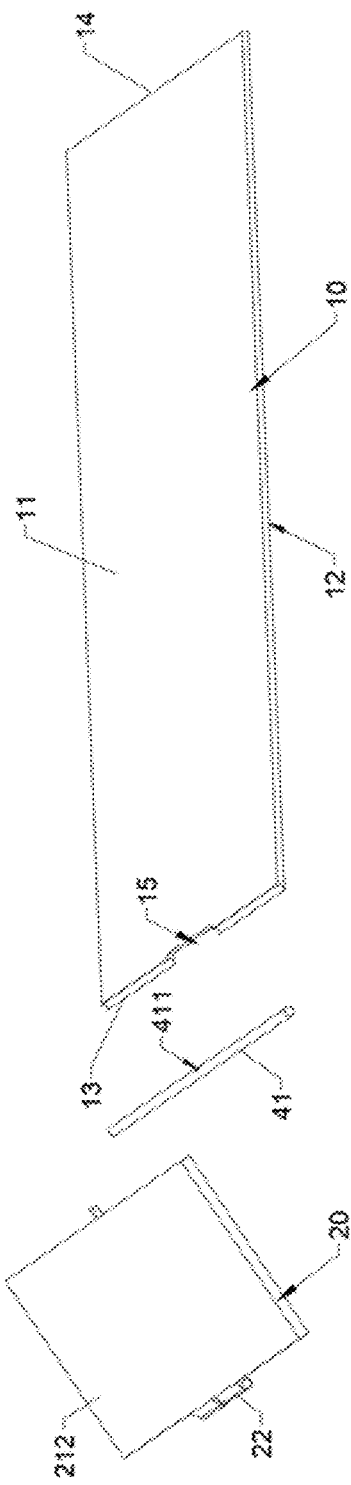
FIG. 6 is a partially exploded schematic structural diagram of the foldable holder shown in FIG. 2.

Referring to FIG. 2 and FIG. 6, FIG. 6 is a partially exploded schematic structural diagram of the foldable holder 100 shown in FIG. 2.

A first connecting portion is a first rotating shaft 41, and the first rotating shaft 41 is a cylindrical rod body provided with a first clamping groove 411. In this embodiment, the first clamping groove 411 is located in a middle part of the first rotating shaft 41. The first clamping groove 411 is used for being clamped with the clamping portion 50. A length of the first rotating shaft 41 is the same as a length of the bottom plate 10 and a length of the first support plate 20. That is, a size of the first rotating shaft 41 in the Y direction, the size of the first support plate 20 in the Y direction, and the size of the bottom plate 10 in the Y direction are all the same. Certainly, the length of the first rotating shaft 41 may also be slightly less than the length of the bottom plate 10 and the length of the first support plate 20. The first rotating shaft 41 is fixedly connected to the bottom plate 10, and rotationally connected to the first support plate 20, and the first support plate 20 can rotate relative to the first rotating shaft 41, so that the first support plate 20) rotates relative to the bottom plate 10.

The first support plate 20 is rotationally connected to the bottom plate 10 through the first rotating shaft 41, the first rotating shaft 41 is mounted in the first shaft hole 221 of the first shaft sleeve 22 of the first support plate 20 and both ends of the first rotating shaft 41 extend out of the first shaft sleeve 22, and the first clamping groove 411 on the first rotating shaft 41 is opposite to the second avoidance groove 222 on the first shaft sleeve 22, exposed from the second avoidance groove 222, and used for being clamped with the clamping portion 50. The first rotating shaft 41 is rotationally connected to the first shaft sleeve 22, outer peripheral surfaces of both ends of the first rotating shaft 41 extending from the first shaft sleeve 22 are fixedly connected to the first side surface 13 of the bottom plate 10, and the first shaft sleeve 22 is located in the first avoidance groove 15. The first shaft sleeve 22 can rotate around the first rotating shaft 41, to drive the first support plate 20 to rotate around the first rotating shaft 41, so that the first support plate 20 rotates relative to the bottom plate 10. In this embodiment, the first shaft sleeve 22 is a cylinder, and the second avoidance groove 222 divides the first shaft sleeve 22 into two sections. In some other embodiments, the second avoidance groove 222 may account for half of an outer circumference of the first shaft sleeve 22, or the second avoidance groove 222 may account for a quarter of the outer circumference of the first shaft sleeve 22. As long as it can be ensured that when the foldable holder is in the open state or the semi-unfolded state, the first clamping groove 411 can be exposed through the second avoidance groove 222, so that the clamping portion 50 can clamp the first rotating shaft 41. In this embodiment, by providing the first avoidance groove 15, an avoidance space can be provided for rotation of the first shaft sleeve 22.

Referring to FIG. 1 together, when the foldable holder 100 is in the closed state, the first support plate 20 is stacked with the bottom plate 10. The first surface 211 of the first support plate 20 is arranged opposite to the upper surface 11 of the bottom plate 10. Certainly, the first surface 211 may also be in contact with the upper surface 11.

The first support plate 20 is rotated counterclockwise ω1, so that the first shaft sleeve 22 rotates counterclockwise ω1 around the first rotating shaft 41, to drive the first support plate 20) to rotate counterclockwise ω1 around the first rotating shaft 41. The first support plate 20 moves away from the bottom plate 10, the first support plate 20 is arranged at an angle to the bottom plate 10, so that the foldable holder 100 is in the semi-unfolded state (as shown in FIG. 2) or the open state (as shown in FIG. 3). When the foldable holder 100 is in the open state or the semi-unfolded state, the angle between the first support plate 20 and the bottom plate 10 is a first angle α. The first angle α is less than or equal to 90 degrees. In this embodiment, the first angle α is 45 degrees. In some other embodiments, the first angle α may also be 30 degrees. 60 degrees or 70 degrees.

Referring to FIG. 2 together, when the foldable holder 100 is in the semi-unfolded state, the first support plate 20 is rotated clockwise ω2, so that the first shaft sleeve 22 rotates clockwise ω2 around the first rotating shaft 41, to drive the first support plate 20 to rotate clockwise ω2 around the first rotating shaft 41. The first support plate 20 moves towards the bottom plate 10 until the first support plate 20 is stacked with the bottom plate 10, so that the foldable holder 100 returns to the closed state (as shown in FIG. 1).

In this embodiment, by rotating the first support plate 20 clockwise ω2 or counterclockwise ω1 around the first rotating shaft 41, the first support plate 20 can be moved towards or away from the bottom plate 10, so that the first support plate 20 is closed or opened relative to the bottom plate 10. At the same time, the first support plate 20 drives the connected second support plate 30 to rotate relative to the bottom plate 10, and an angle of the second support plate 30 relative to the first support plate 20 can be adjusted through the second rotating portion.

In an implementation, the first rotating portion further includes a locking member (not shown), and the locking member is mounted on the first rotating shaft 41. The locking member is used for locking the first rotating shaft 41, to lock the first support plate 20, to locate the first support plate 20 and the bottom plate 10. Specifically, when the foldable holder 100 is in the semi-unfolded state, the locking member locks the first rotating shaft 41, to prevent the first support plate 20 from rotating around the first rotating shaft 41, so that the angle between the first support plate 20 and the bottom plate 10 remains to be the first angle α.

Figure 7:
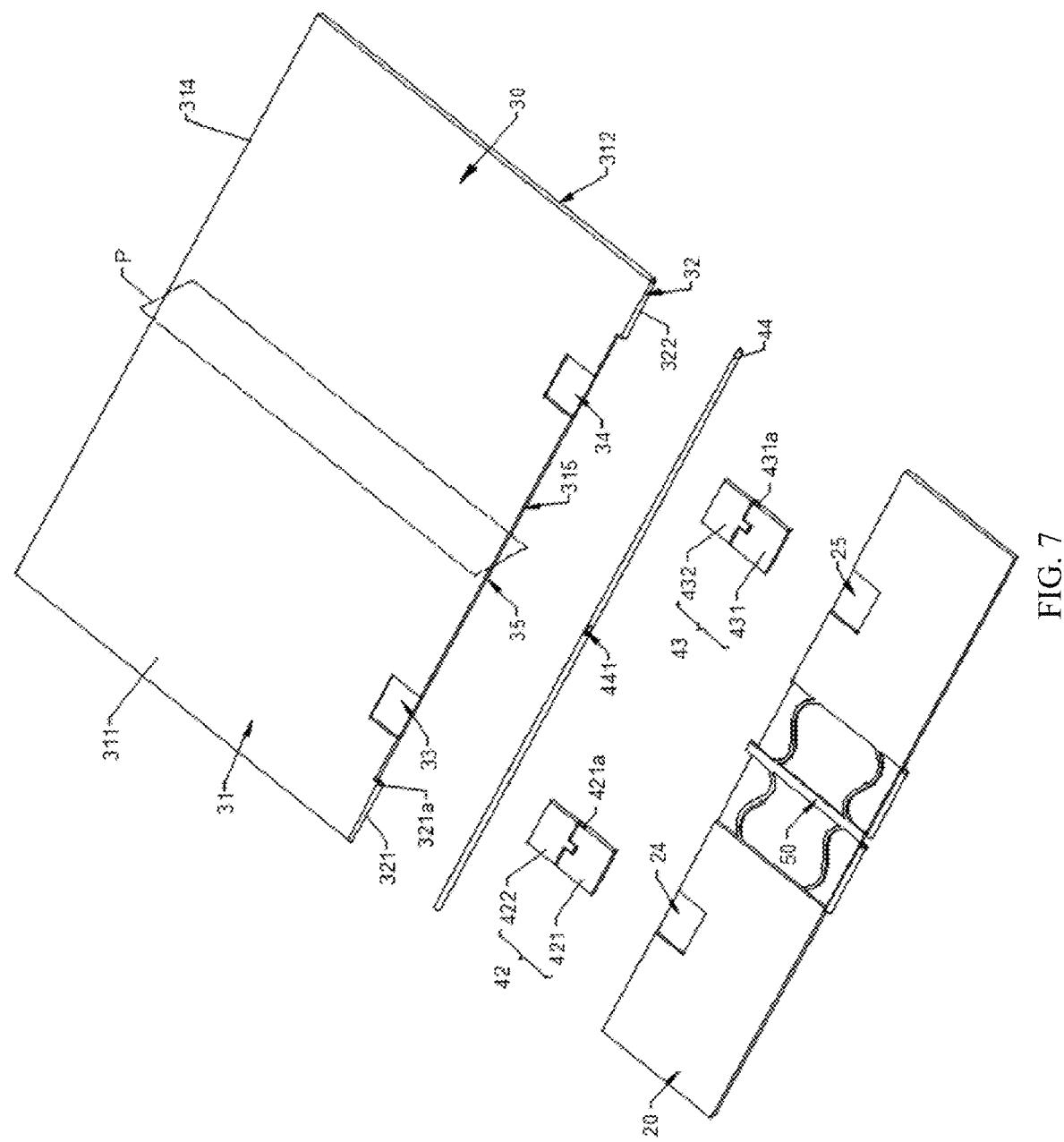
FIG. 7 is a partially exploded schematic structural diagram of the foldable holder shown in FIG. 2.

Referring to FIG. 7, FIG. 7 is a partially exploded schematic structural diagram of the foldable holder 100 shown in FIG. 2.

The second support plate 30 includes a second body 31 and a second shaft sleeve 32. For ease of description, a second reference surface P is provided in this embodiment.

The second reference surface P is parallel to the X direction and the Z direction, and the second support plate 30 is symmetrical about the second reference surface P. It should be noted that the second reference surface P does not actually exist.

The second body 31 is a rectangular thin plate, and a length of the second body 31 is equal to a length of the first body 21. Certainly, a small deviation (within tolerance) can also be allowed for the length of the second body 31 and the first body 21. That is, a size of the second support plate 30 in the Y direction is the same as a size of the first support plate 20 in the Y direction. The second body 31 includes a third surface 311, a fourth surface 312, a fifth side surface 315, and a sixth side surface 314. The third surface 311 and the fourth surface 312 are arranged opposite to each other, and when the foldable holder 100 is in the closed state, both the third surface 311 and the fourth surface 312 are perpendicular to the Z direction. The fifth side surface 315 and the sixth side surface 314 are arranged opposite to each other, and length directions of both the fifth side surface 315 and the sixth side surface 314 are parallel to the Y direction. Both the fifth side surface 315 and the sixth side surface 314 are connected between the third side surface 311 and the fourth side surface 312.

The third surface 311 is recessed with a third groove 33 and a fourth groove 34. The third groove 33 and the fourth groove 34 are arranged at intervals in the Y direction, and both the third groove 33 and the fourth groove 34 are located at an end close to the fifth side surface 315 and run through the fifth side surface 315. A position of the third groove 33 corresponds to a position of the first groove 24, and a position of the fourth groove 34 corresponds to a position of the second groove 25.

The second shaft sleeve 32 includes a first sub shaft sleeve 321 and a second sub shaft sleeve 322. Both the first sub shaft sleeve 321 and the second sub shaft sleeve 322 are hollow cylinders. The first sub shaft sleeve 321 is provided with a first sub shaft hole 321a, and the second sub shaft sleeve 322 is provided with a second sub shaft hole. The first sub shaft sleeve 321 and the second sub shaft sleeve 322 are located at two opposite ends of the fifth side surface 315 respectively, and are fixedly connected to the fifth side surface 315. In addition, axes of the first sub shaft hole 321a and the second sub shaft hole are collinear and parallel to a length direction of the fifth side surface 315. There is a notch between the first sub shaft sleeve 321 and the second sub shaft sleeve 322, and the notch and the fifth side surface 315 form a third avoidance groove 35. The fifth side surface 315 is a bottom wall of the third avoidance groove 35.

In an implementation, the first sub shaft sleeve 321 and the second sub shaft sleeve 322 may also be solid cylinders. The first sub shaft sleeve 321 and the second sub shaft sleeve 322 are used for being connected to a second connecting portion.

In this embodiment, the second shaft sleeve 32 and the second body 31 are integrally formed to ensure structural stability of the second support plate 30. In some other embodiments, the second shaft sleeve 32 and the second body 31 may also be fixedly connected by welding, screwing or bonding.

Referring to FIG. 7, FIG. 7 is a partially exploded schematic structural diagram of the foldable holder 100 shown in FIG. 2.

The second rotating portion includes a first hinge 42, a second hinge 43, and a second rotating shaft 44. The first hinge 42 and the second hinge 43 are rotationally mounted on the second rotating shaft 44, and the second rotating shaft 44 is fixedly connected to the second support plate 30. The first hinge 42 and the second hinge 43 are respectively connected to the first support plate 20 and the second support plate 30, and ensure that the first support plate 20 and the second support plate 30 can rotate relative to each other.

In this embodiment, the first hinge 42 includes a first fixing plate 421 and a second fixing plate 422. Both the first fixing plate 421 and the second fixing plate 422 are rectangular thin plates, a side of the first fixing plate 421 is provided with a first connecting hole 421a, and a side of the second fixing plate 422 is provided with a second connecting hole (not shown). When the first fixing plate 421 and the second fixing plate 422 are butted together, axes of the first connecting hole 421a and the second connecting hole are on the same straight line, and the first connecting hole 421a is in communication with the second connecting hole. The second rotating shaft 44 runs through the first connecting hole 421a and the second connecting hole, so that the second fixing plate 422 and the first fixing plate 421 are mounted on the second rotating shaft 44, and the second rotating shaft 44 is rotationally connected to the first fixing plate 421 and fixedly connected to the second fixing plate 422. The first fixing plate 421 can rotate around the second rotating shaft 44, so that the second fixing plate 422 rotates relative to the first fixing plate 421. In this embodiment, there is a damper between the second rotating shaft 44 and the first fixing plate 421, and when the second fixing plate 422 rotates relative to the first fixing plate 421, the second fixing plate 422 can be suspended at any angle. That is, the first hinge 42 can be suspended at any angle during rotation.

The second hinge 43 includes a third fixing plate 431 and a fourth fixing plate 432. Both the third fixing plate 431 and the fourth fixing plate 432 are rectangular thin plates, a side of the third fixing plate 431 is provided with a third connecting hole 431a, and a side of the fourth fixing plate 432 is provided with a fourth connecting hole (not shown). When the third fixing plate 431 and the fourth fixing plate 432 are butted together, axes of the third connecting hole 431a and the fourth connecting hole are on the same straight line, and the third connecting hole 431a is in communication with the fourth connecting hole. The second rotating shaft 44 runs through the third connecting hole 431a and the fourth connecting hole, so that the fourth fixing plate 432 and the third fixing plate 431 are rotationally arranged on the second rotating shaft 44, and the second rotating shaft 44 is rotationally connected to the third fixing plate 431 and fixedly connected to the fourth fixing plate 432. The third fixing plate 431 can rotate around the second rotating shaft 44, so that the fourth fixing plate 432 can rotate relative to the third fixing plate 431. In this embodiment, there is a damper between the second rotating shaft 44 and the third fixing plate 431, and when the fourth fixing plate 432 rotates relative to the third fixing plate 431, the fourth fixing plate 432 can be suspended at any angle. That is, the second hinge 43 can be suspended at any angle during rotation.

In this embodiment, the second rotating shaft 44 is provided with a second clamping groove 441. The second clamping groove 441 is located in a middle part of the second rotating shaft 44. The second clamping groove 441 is used for being clamped with the clamping portion 50. The length of the second rotating shaft 44 is approximately the same as the length of the first support plate 20 and the length of the second support plate 30. That is, a size of the second rotating shaft 44 in the Y direction, the size of the first support plate 20 in the Y direction, second the size of the second support plate 30 in the Y direction are approximately the same. Certainly, the length of the second rotating shaft 44 may also be slightly less than the length of the first support plate 20 and the length of the second support plate 30.

The first support plate 20 is connected to the second support plate 30, and the second rotating shaft 44 mounted with the first hinge 42 and the second hinge 43 is fixedly connected to the second shaft sleeve 32. Two opposite ends of the second rotating shaft 44 are located in the first sub shaft hole 321a and the second sub shaft hole respectively, and fixedly connected to the first sub shaft sleeve 321 and the second sub shaft sleeve 322 respectively. In addition, the first hinge 42 connects the first support plate 20 to the second support plate 30. The first fixing plate 421 is located in the first groove 24, and fixedly connected to an inner wall of the first groove 24. The second fixing plate 422 is located in the third groove 33, and fixedly connected to an inner wall of the third groove 33. The second hinge 43 connects the first support plate 20 to the second support plate 30. The third fixing plate 431 is located in the second groove 25, and fixedly connected to an inner wall of the second groove 25. The fourth fixing plate 432 is located in the fourth groove 34, and fixedly connected to an inner wall of the fourth groove 34.

In an implementation, in an actual assembling process, first, the first fixing plate 421 and the third fixing plate 431 can be mounted on the first support plate 20, and the second fixing plate 422 and the fourth fixing plate 432 can be arranged on the second support plate 30. Then, the second support plate 30 is butted with the first support plate 20, the first fixing plate 421 is butted with the second fixing plate 422, and the third fixing plate 431 is butted with the fourth fixing plate 432. Next, the second rotating shaft 44 runs through the first sub shaft hole 321a, the first connecting hole 421a, the second connecting hole, the third connecting hole 431a, the fourth connecting hole, and the second sub shaft hole in sequence, and the second rotating shaft 44 is fixedly connected to the first sub shaft sleeve 321, the second fixing plate 422, the fourth fixing plate 432, and the second sub shaft sleeve 322, and rotationally connected to the first fixing plate 421 and the third fixing plate 431.

As shown in FIG. 2, when the foldable holder 100 is in the semi-unfolded state, the first support plate 20 is parallel to the second support plate 30. The first surface 211 is at a same side with the third surface 311, and the second surface 212 is at a same side with the fourth surface 312. The second support plate 30 is rotated counterclockwise ω1, to drive the second rotating shaft 44 to rotate counterclockwise ω1 in the first connecting hole 421a and the third connecting hole 431a, so that the second rotating shaft 44 rotates counterclockwise ω1 relative to the first fixing plate 421 and the third fixing plate 431. That is, the second support plate 30 drives the second rotating shaft 44 to rotate counterclockwise ω1 relative to the first support plate 20, to drive the second fixing plate 422 to rotate counterclockwise ω1 relative to the first fixing plate 421, and the fourth fixing plate 432 rotates counterclockwise ω1 relative to the third fixing plate 431, to drive the second support plate 30 to rotate counterclockwise ω1 relative to the first support plate 20, so that the foldable holder 100 is in the open state shown in FIG. 3. When the foldable holder 100 is in the open state, the second support plate 30 is arranged at an angle to the first support plate 20. In this case, an angle between the second support plate 30 and the first support plate 20 is a second angle β. The second angle β is greater than 0 degrees and less than 180 degrees. In this embodiment, the second angle β is 100 degrees. In some other embodiments, the second angle β may also be 90 degrees or 120 degrees.

Referring to FIG. 3, when the foldable holder 100 is in the open state, the second support plate 30 is rotated clockwise ω2, to drive the second rotating shaft 44 to rotate clockwise ω2 in the first connecting hole 421a and the third connecting hole 431a, so that the second rotating shaft 44 rotates clockwise ω2 relative to the first fixing plate 421 and the third fixing plate 431. That is, the second support plate 30 drives the second rotating shaft 44 to rotate clockwise ω2 relative to the first support plate 20, to drive the second fixing plate 422 to rotate clockwise ω2 relative to the first fixing plate 421, and the fourth fixing plate 432 rotates clockwise ω2 relative to the third fixing plate 431, to drive the second support plate 30 to rotate clockwise ω2 relative to the first support plate 20, so that the foldable holder 100 returns to the semi-unfolded state shown in FIG. 2. In this case, the first support plate 20 is parallel to the second support plate 30.

A surface of the first support plate 20 facing away from the bottom plate 10 is an outer surface, and the outer surface is the second surface 212. The second rotating portion is unlocked, the second support plate 30 can reciprocally rotate relative to the first support plate 20 through the second rotating portion, the second support plate 30 and the first support plate 20 can be located at a support angle, and the support angle is an angle between the second support plate 30 and the outer surface, that is, the second angle β. In this embodiment, the second support plate 30 is rotated to drive the second rotating portion to rotate relative to the first support plate 20, to adjust the support angle. That is, adjusting a viewing angle with the bottom plate 10 and the first support plate 20 as bases. When a mobile terminal is located on the second support plate 30, a viewing angle of the user can be adjusted, thereby improving the user experience.

In this embodiment, the foldable holder 100 includes a first locating member 41, the locating member first rotating shaft 41. The locating member is used for locating a rotation angle of the second support plate 30, so that the second support plate 30 can be suspended at any angle. In this embodiment, the locating member is a damper. In some other embodiments, the locating member may also be a magnetic member.

When the second support plate 30 rotates counterclockwise ω1 around the second rotating shaft 44 until the foldable holder is in the open state, that is, when the angle between the second support plate 30 and the first support plate 20 is the second angle β, the locating member locates the second support plate 30, to prevent the second support plate 30 from continuing to rotate counterclockwise ω1 relative to the first support plate 20, and preventing the angle between the second support plate 30 and the first support plate 20 from being greater than the second angle β. In addition, by arranging the locating member, the second support plate 30 can also be fixed, to remain the foldable holder 100 in the open state. When the second support plate 30 rotates clockwise ω2 relative to the first support plate 20 until it is parallel to the first support plate 20, the locating member locates the second support plate 30, to prevent the second support plate 30 from continuing to rotate clockwise ω2 around the second rotating shaft 44 and to remain the second support plate 30 and the first support plate 20 in the parallel state.

In an implementation, the damper can also be arranged between the second rotating shaft 44 and the first fixing plate 421 or between the second rotating shaft 44 and the third fixing plate 431, to locate the rotation angle of the second support plate 30 relative to the first support plate 20.

Figure 8:
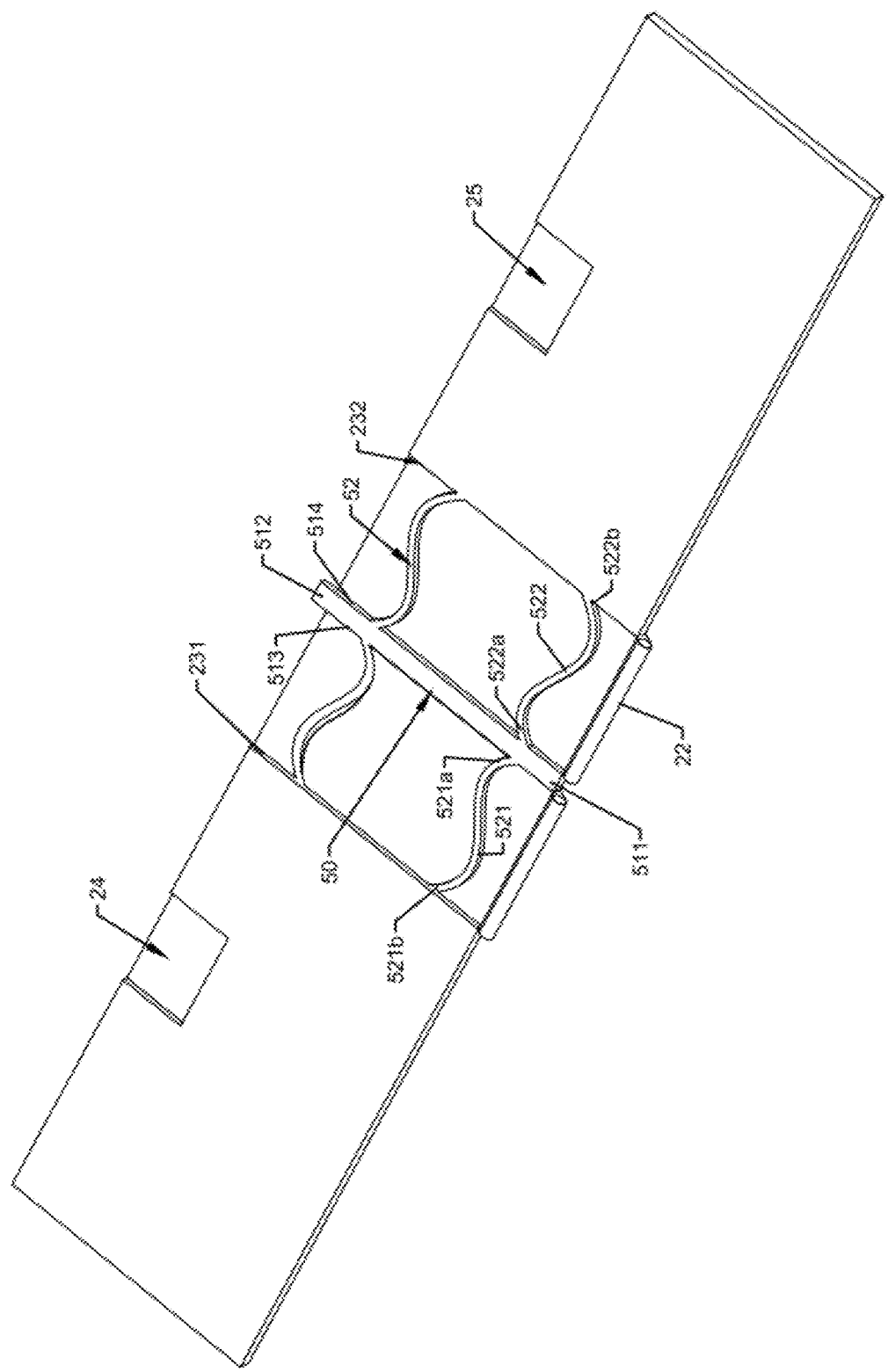
FIG. 8 is a partial schematic structural diagram of the foldable holder shown in FIG. 2.

Referring to FIG. 8. FIG. 8 is a partial schematic structural diagram of the foldable holder 100 shown in FIG. 2.

The clamping portion 50 includes a clamping body 51 and an elastic body 52. In this embodiment, the clamping body 51 is a long strip-shaped block. The clamping body 51 includes a first clamping end 511 and a second clamping end 512, and the first clamping end 511 and the second clamping end 512 are respectively located on two opposite ends of the clamping body 51. The clamping body 51 further includes a first edge 513 and a second edge 514, the first edge 513 and the second edge 514 are arranged opposite to each other, and both the first edge 513 and the second edge 514 are connected between the first clamping end 511 and the second clamping end 512.

The elastic body 52 is an elastic piece or a spring. The elastic body 52 includes a first elastic body 521 and a second elastic body 522. In this embodiment, the first elastic body 521 and the second elastic body 522 are curved elastic pieces, which are specifically wave-shaped. The elastic body 52 has an elastic deformation force parallel to the clamping body 51. There are two first elastic bodies 521, each first elastic body 521 includes a first end 521a and a second end 521b, and the first end 521a and the second end 521b are arranged opposite to each other. The first end 521a of the each first elastic body 521 is fixedly connected to the first edge 513, and the second end 521b is fixedly connected to the first side wall 231. The two first elastic bodies 521 are arranged side by side at intervals along a direction parallel to the clamping body 51. There are two second elastic bodies 522, each second elastic body 522 includes a third end 522a and a fourth end 522b, and the third end 522a and the fourth end 522b are arranged opposite to each other. The third end 522a of the each second elastic body 522 is fixedly connected to the second edge 514, and the fourth end 522b is fixedly connected to the second side wall 232. The two second elastic bodies 522 are arranged side by side at intervals along the direction parallel to the clamping body 51. The two first elastic bodies 521 and the two second elastic bodies 522 are symmetrically arranged on two opposite sides of the clamping body 51. In some other embodiments, there may also be one, three, or more than three first elastic bodies 521, there may also be one, three, or more than three second elastic bodies 522.

In this embodiment, the clamping portion 50 is mounted in the mounting groove 23 of the first support plate 20, to save space, so that the thickness of the foldable holder 100 can be reduced to implement thinning. In addition, the clamping body 51 can move relative to the mounting groove 23 along a length direction of the clamping body 51. When the clamping portion 50 is located in the mounting groove 23, the elastic body 52 is in a pre-compressed state, and the elastic body 52 has a deformation force towards the first shaft sleeve 22, so that the elastic body 52 tends to slide towards the first shaft sleeve 22.

Figure 9:
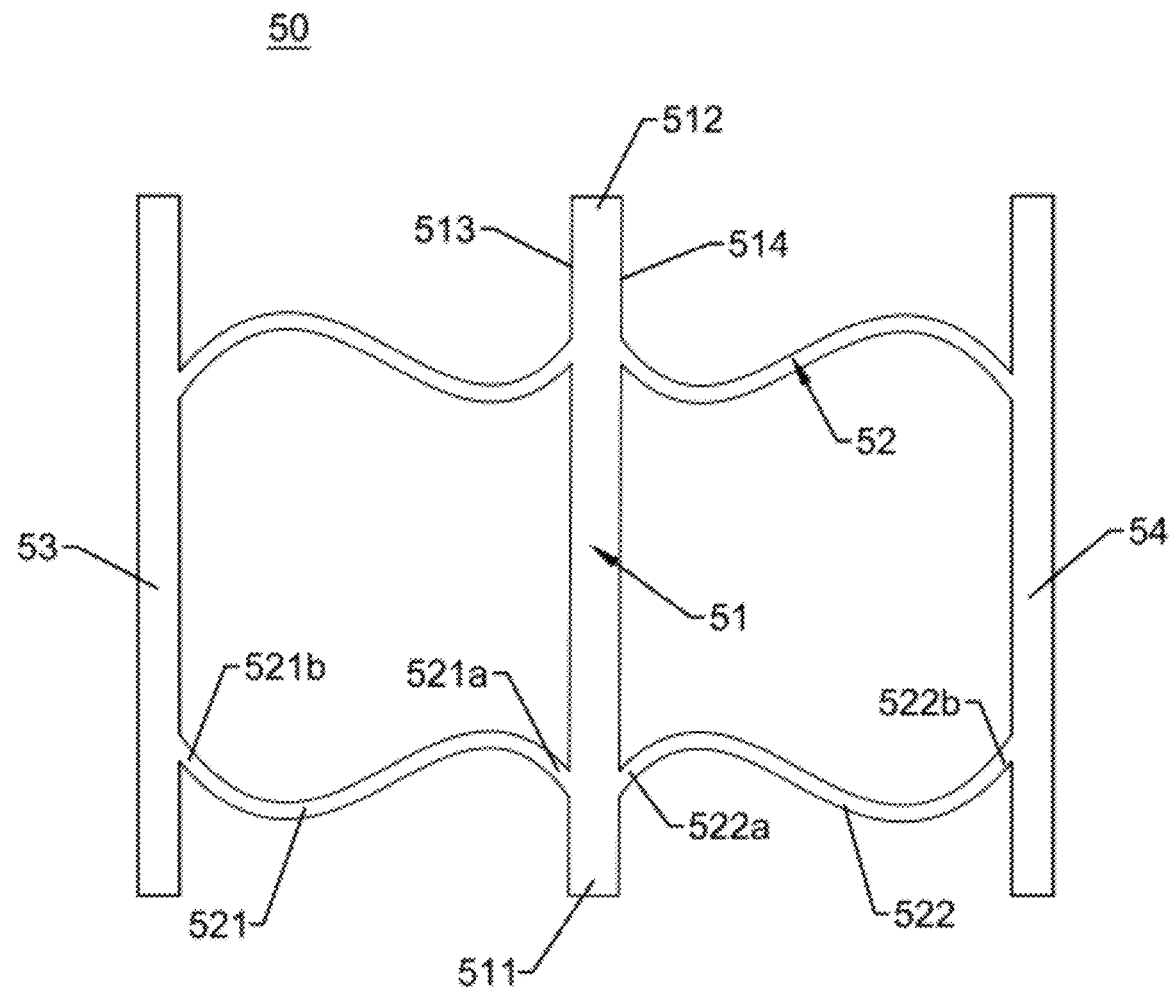
FIG. 9 is a schematic structural diagram of a clamping portion of the foldable holder shown in FIG. 2 in another implementation.

Referring to FIG. 9. FIG. 9 is a schematic structural diagram of a clamping portion 50 of the foldable holder 100 shown in FIG. 2 in another implementation.

In this implementation, the clamping portion 50 further includes a first fixing member 53 and a second fixing member 54. Both the first fixing member 53 and the second fixing member 54 are strip-shaped structures. The first fixing member 53 and the second fixing member 54 are respectively located on the two opposite sides of the clamping body 51, and extension directions of the first fixing member 53 and the second fixing member 54 are parallel to an extension direction of the clamping body 51. The first end 521a of the each first elastic body 521 is fixedly connected to the first edge 513, and the second end 521b is fixedly connected to the first fixing member 53. The third end 522a of the each second elastic body 522 is fixedly connected to the second edge 514, and the fourth end 522b is fixedly connected to the second fixing member 54. The clamping portion 50 is mounted on the mounting groove 23, the first fixing member 53 is fixedly connected to the first side wall 231, the second fixing member 54 is fixedly connected to the second side wall 232, and the extension directions of the first fixing member 53 and the second fixing member 54 are parallel to the Y direction. The elastic body 52 is in a compressed state. In some other embodiments, the first fixing member 53 and the second fixing member 54 can also be fixedly connected to a bottom wall of the mounting groove 23.

Figure 10:
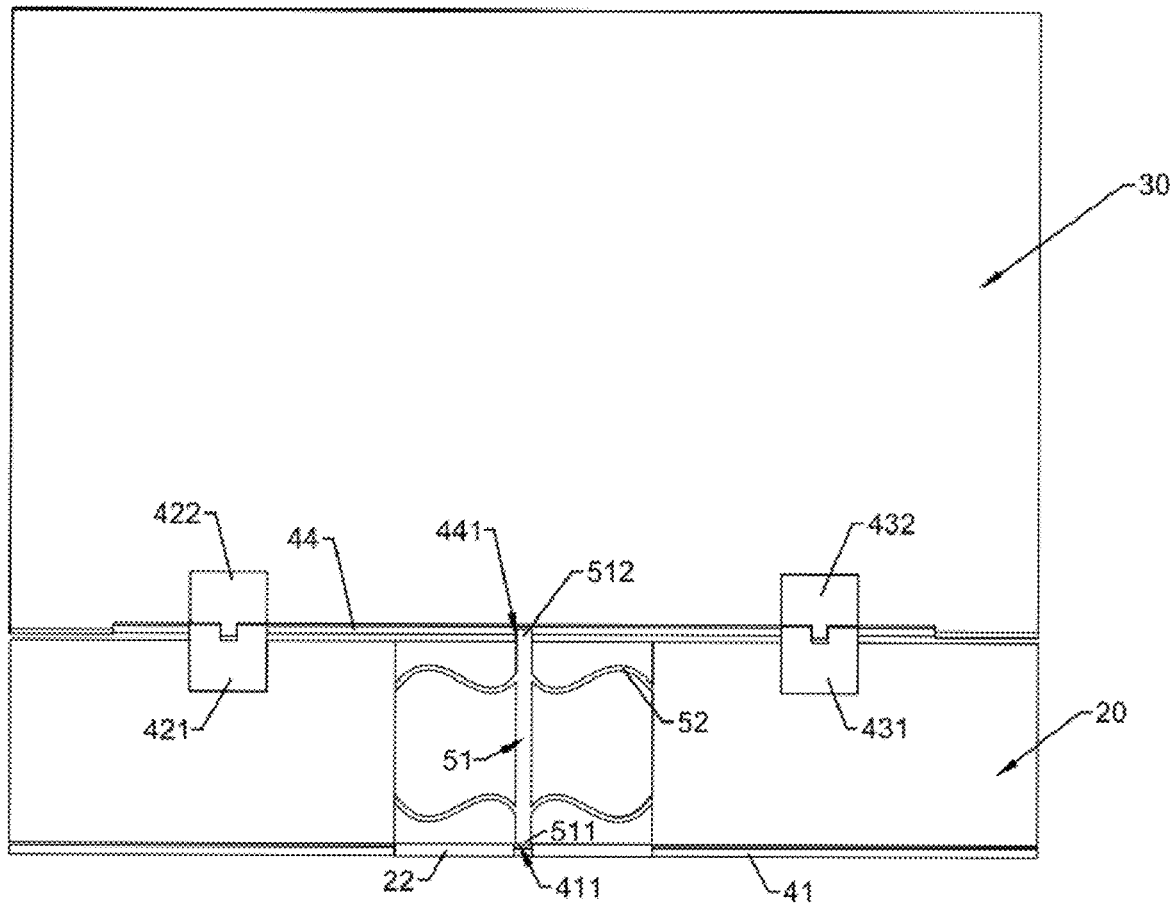
FIG. 10 is a partial schematic structural diagram of the foldable holder shown in FIG. 1 in a closed state.

Referring to FIG. 1 and FIG. 10. FIG. 10 is a partial schematic structural diagram of the foldable holder 100 shown in FIG. 1 in a closed state.

When the foldable holder 100 is in the closed state, the first support plate 20 and the second support plate 30 are arranged side by side along the X direction, and both the first support plate 20 and the second support plate 30 are stacked with the bottom plate 10. It can be understood that the first support plate 20 and the second support plate 30 are in an integral flat shape. The second clamping end 512 of the clamping body 51 is located in the second clamping groove 441, and clamps the second rotating shaft 44, to prevent the second rotating shaft 44 from rotating in the first fixing plate 421 and the third fixing plate 431, to prevent the second support plate 30 from rotating relative to the first support plate 20. At the same time, the first clamping end 511 is staggered with the first clamping groove 411, and the first clamping end 511 abuts against a surface of the first rotating shaft 41. The elastic body 52 is in the pre-compressed state, and an elastic restoring force of the elastic body 52 has a component force towards the first rotating shaft 41, so that the clamping body 51 tends to slide towards the first rotating shaft 41.

The first support plate 20 or the second support plate 30 is rotated counterclockwise ω1, so that the first shaft sleeve 22 rotates counterclockwise ω1 around the first rotating shaft 41, to drive the first support plate 20 to rotate counterclockwise ω1 around the first rotating shaft 41. That is, the first support plate 20 and the second support plate 30 rotate counterclockwise ω1 together relative to the bottom plate 10. In this case, when the clamping portion 50 follows the first support plate 20 to rotate relative to the first rotating shaft 41 until the first clamping end 511 rotates to be opposite to the first clamping groove 411, and the elastic body 52 is elastically recovered, to drive the clamping body 51 to slide towards the first rotating shaft 41, so that the first clamping end 511 is located in the first clamping groove 411 and clamps the first rotating shaft 41, so that the foldable holder 100 is in the semi-unfolded state (as shown in FIG. 2).

In this embodiment, by arranging the clamping portion 50, when the foldable holder 100 is in the closed state, the clamping body 51 clamps the second rotating shaft 44, and when the first support plate 20 or the second support plate 30 is rotated, the first support plate 20 and the second support plate 30 can remain stationary, that is, the first support plate 20 and the second support plate 30 can rotate together relative to the bottom plate 10, so that the foldable holder 100 can be transformed from the closed state to the semi-unfolded state.

Figure 11:
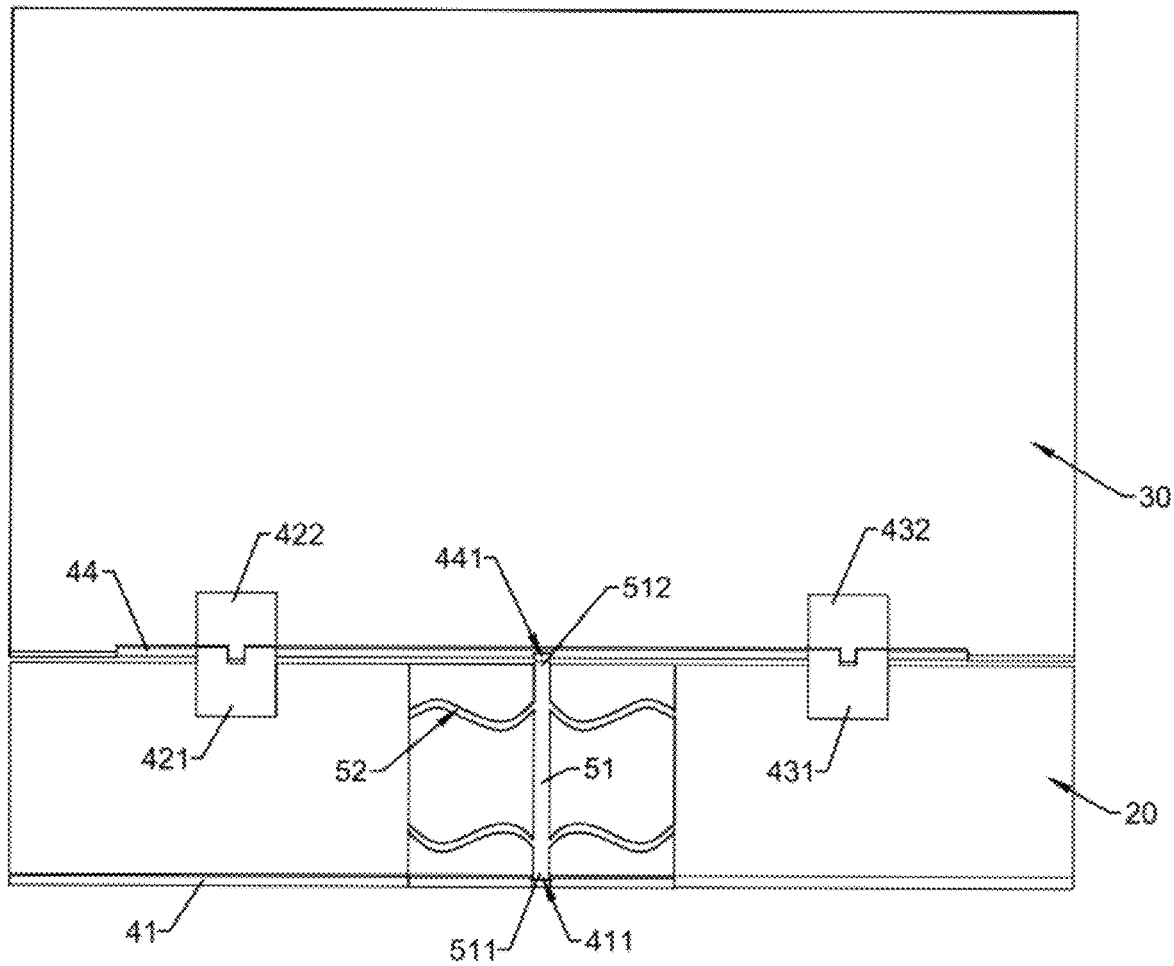
FIG. 11 is a partial schematic structural diagram of the foldable holder shown in FIG. 2 in a semi-unfolded state.

Referring to FIG. 2 and FIG. 11. FIG. 11 is a partial schematic structural diagram of the foldable holder 100 shown in FIG. 2 in a semi-unfolded state.

When the foldable holder 100 is in the semi-unfolded state, the first support plate 20 is parallel to the second support plate 30, and the angle between the first support plate 20 and the bottom plate 10 is the first angle α. The first clamping end 511 of the clamping body 51 is located in the first clamping groove 411, and clamps the first rotating shaft 41, the locking member locks the first rotating shaft 41, and the clamping body 51 and the locking member lock the first rotating shaft 41 together, to prevent the first support plate 20 from continuing to rotate around the first rotating shaft 41. The second clamping end 512 is disengaged from the second clamping groove 441, and releases the second rotating shaft 44. Rotating the second support plate 30) can drive the second support plate 30 to rotate relative to the first support plate 20.

The second support plate 30 is rotated counterclockwise ω1 to drive the second rotating shaft 44 to rotate counterclockwise ω1 relative to the first support plate 20, to drive the second fixing plate 422 to rotate counterclockwise ω1 relative to the first fixing plate 421, and the fourth fixing plate 432 rotates counterclockwise ω1 relative to the third fixing plate 431, to drive the second support plate 30 to rotate counterclockwise ω1 relative to the first support plate 20, so that the foldable holder 100 is in the open state (as shown in FIG. 3). In this case, the angle between the second support plate 30 and the first support plate 20 is the second angle β, and the angle between the first support plate 20 and the bottom plate 10 is the first angle α. The locating member locates the second support plate 30, to remain the angle between the first support plate 20 and the second support plate 30 at the second angle β, and remain the foldable holder 100 in the open state. In addition, a state of the clamping body 51 is the same as a state of the foldable holder 100 in the semi-unfolded state, and the first clamping end 511 of the clamping body 51 is located in the first clamping groove 411 and clamps the first rotating shaft 41, to prevent the first support plate 20 from rotating relative to the bottom plate 10.

Referring to FIG. 3 again, the second support plate 30 is rotated clockwise ω2, to drive the second rotating shaft 44 to rotate clockwise ω2 relative to the first support plate 20, to drive the second fixing plate 422 to rotate clockwise ω2 relative to the first fixing plate 421, and the fourth fixing plate 432 rotates clockwise ω2 relative to the third fixing plate 431, to drive the second support plate 30 to rotate clockwise ω2 relative to the first support plate 20 until the first support plate 20 is parallel to the second support plate 30, so that the foldable holder 100 is in the semi-unfolded state shown in FIG. 2. It should be noted that when the foldable holder 100 is in the open state, a force required to rotate the second support plate 30 clockwise ω2 is less than a locking force of the clamping body 51 and a locking member on the first rotating shaft 41, to ensure that when the second support plate 30 is rotated clockwise ω2, the second support plate 30 rotates relative to the first support plate 20, and the first support plate 20 and the bottom plate 10 are relatively stationary, thereby ensuring opening and closing logic of the foldable holder 100.

Referring to FIG. 2 and FIG. 11, when the foldable holder 100 is in the semi-unfolded state, the first support plate 20 is parallel to the second support plate 30, and the angle between the first support plate 20 and the bottom plate 10 is the first angle α. The first clamping end 511 of the clamping body 51 is located in the first clamping groove 411 and clamps the first rotating shaft 41. The first hinge 42 and the second hinge 43 locate the second support plate 30, to prevent the second support plate 30 from continuing to rotate clockwise ω2 relative to the first support plate 20, and to remain the first support plate 20 and the second support plate 30 in the parallel state.

The first support plate 20 or the second support plate 30 is rotated clockwise ω2, so that the first shaft sleeve 22 rotates clockwise ω2 around the first rotating shaft 41, to drive the first support plate 20 to rotate clockwise ω2 around the first rotating shaft 41. That is, the first support plate 20 and the second support plate 30 rotate clockwise ω2 together relative to the bottom plate 10. In this case, the clamping portion 50 follows the first support plate 20 to rotate relative to the first rotating shaft 41, the first clamping end 511 is disengaged from the first clamping groove 411, and under an abutting effect of the first rotating shaft 41, the clamping body 51 moves towards the second rotating shaft 44 until the second clamping end 512 is located in the second clamping groove 441 and clamps the second rotating shaft 44, so that the foldable holder 100 is in the closed state shown in FIG. 1.

In this embodiment, one side wall of the first clamping groove 411 is a curved surface. When the foldable holder 100 is transformed from the semi-unfolded state to the closed state, and the first support plate 20 is rotated clockwise ω2, the clamping portion 50 follows the first support plate 20 to rotate relative to the first rotating shaft 41, and the first clamping end 511 slides out of the curved side wall of the first clamping groove 411 and is disengaged from the first clamping groove 411.

Referring to FIG. 3, when the foldable holder 100 is in the open state, the second support plate 30 may be used for placing a tablet computer or a mobile phone, to facilitate use of the user. The upper surface 11 of the bottom plate 10 may be used for placing a keyboard, and the keyboard is connected to the tablet computer, to realize signal transmission between the tablet computer and the keyboard.

In an implementation, the foldable holder 100 further includes a keyboard. The keyboard is located on the upper surface 11 of the bottom plate 10, and fixedly connected to the bottom plate 10. The keyboard is connected to the tablet computer, to realize signal transmission between the tablet computer and the keyboard.

Figure 12:
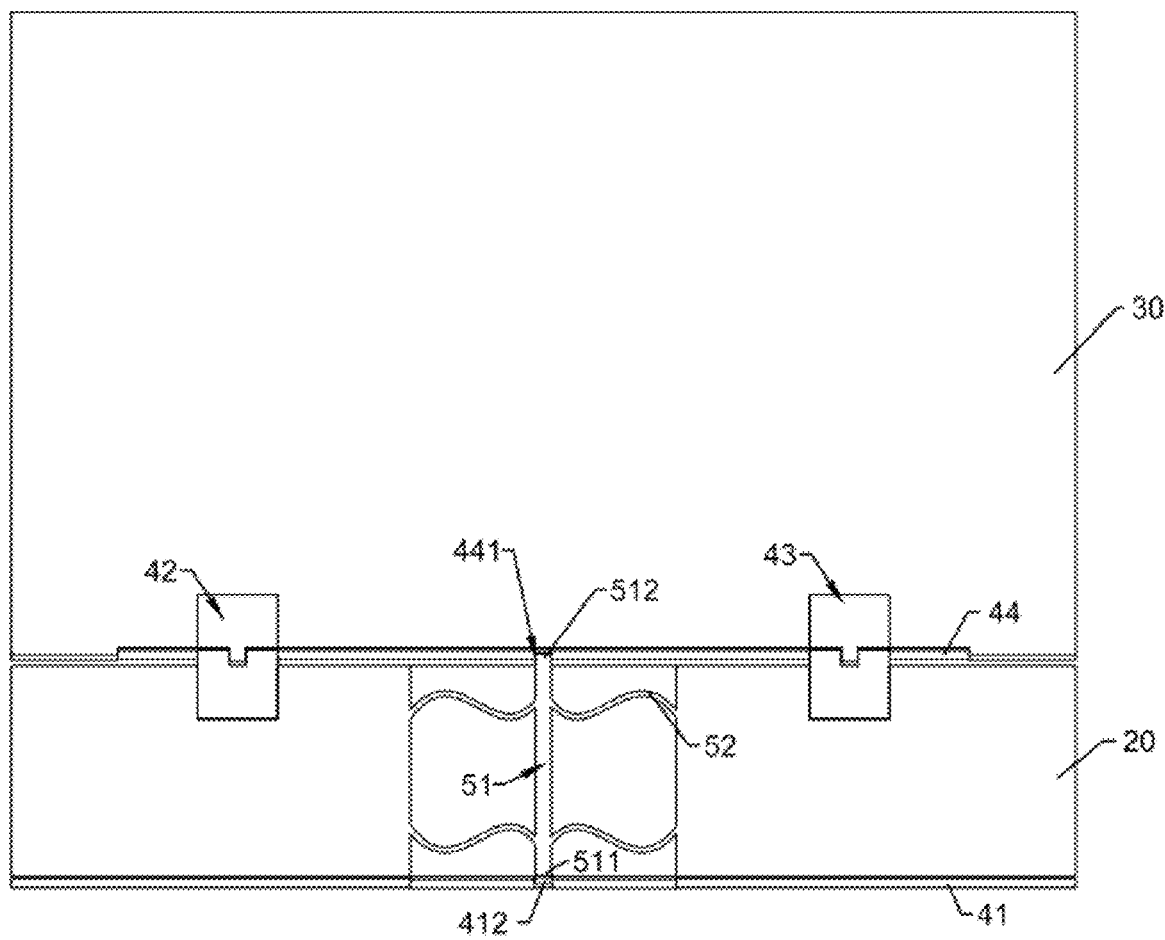
FIG. 12 is a partial schematic structural diagram of a foldable holder according to another embodiment of this application.
Figure 13:
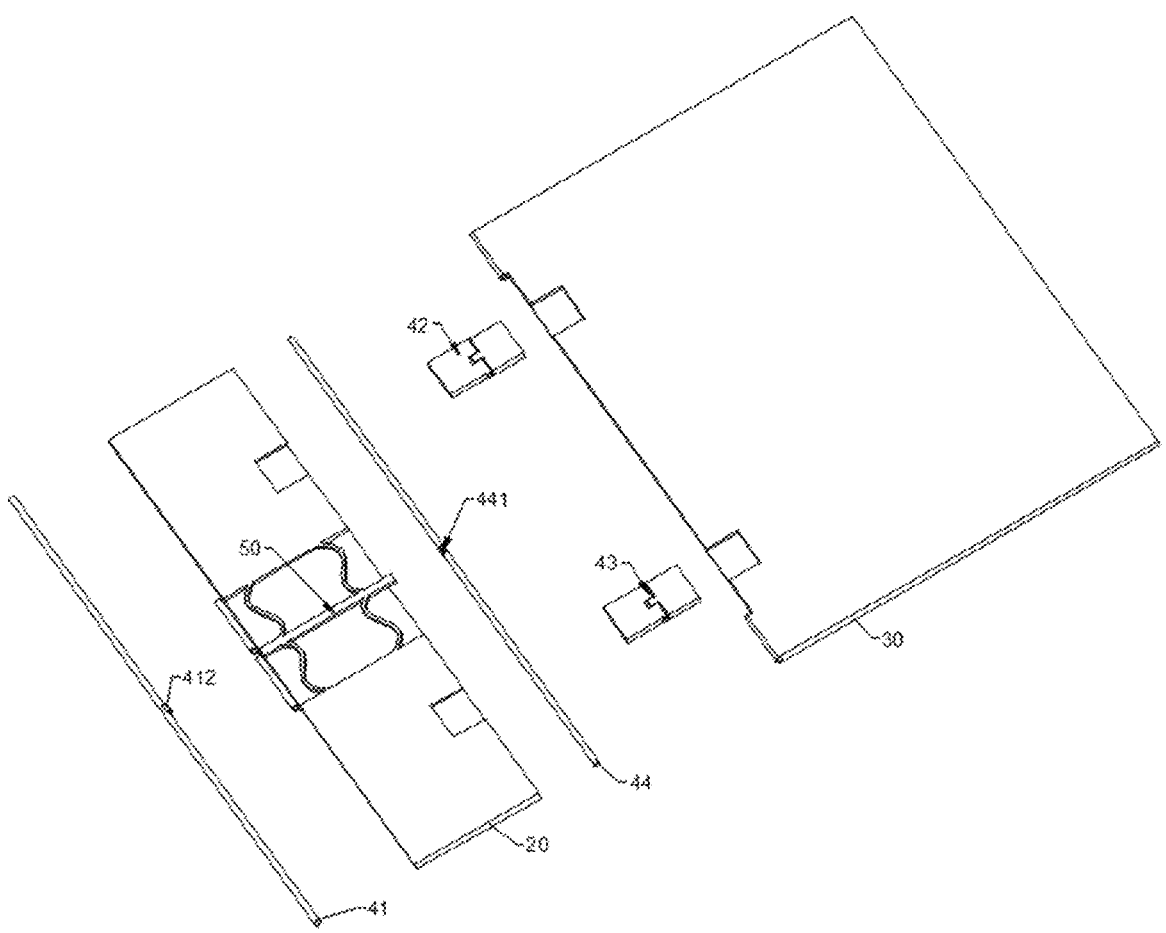
FIG. 13 is a partially exploded schematic structural diagram of the foldable holder shown in FIG. 12.

Referring to FIG. 12 and FIG. 13, FIG. 12 is a partial schematic structural diagram of a foldable holder 100 according to another embodiment of this application: and FIG. 13 is a partially exploded schematic structural diagram of the foldable holder shown in FIG. 12

In another embodiment of this application, a difference from the previous embodiment is that the first rotating portion includes a bump 412, where the bump 412 is fixedly connected to the first rotating shaft 41 and protrudes from the surface of the first rotating shaft 41, and the bump 412 is located in the middle part of the first rotating shaft 41 and arranged opposite to the clamping portion 50. It can be understood that the bump is located in the first clamping groove 411.

When the foldable holder 100 is in the closed state, the bump 412 abuts against the first clamping end 511, and the second clamping end 512 of the clamping body 51 is located in the second clamping groove 441 and clamps the second rotating shaft 44, to prevent the second rotating shaft 44 from rotating, to prevent the second support plate 30 from rotating relative to the first support plate 20. The first support plate 20 is rotated, so that the first shaft sleeve 22 rotates around the first rotating shaft 41, to drive the first support plate 20 to rotate around the first rotating shaft 41.

The first support plate 20 or the second support plate 30 is rotated counterclockwise ω1, so that the first support plate 20 and the second support plate 30 rotate counterclockwise ω1 together relative to the bottom plate 10. In this case, when the clamping portion 50 follows the first support plate 20 to rotate relative to the first rotating shaft 41 until the first clamping end 511 rotates to be disengaged from the bump 412, the elastic body 52 is elastically recovered, to drive the clamping body 51 to slide towards the first rotating shaft 41, so that the second clamping end 512 is disengaged from the bump 412, so that the foldable holder 100 is in the semi-unfolded state (as shown in FIG. 2).

When the foldable holder 100 is in the semi-unfolded state, the locking member locks the first rotating shaft 41, to prevent the first support plate 20 from continuing to rotate. At the same time, the second clamping end 512 is disengaged from the second clamping groove 441, and releases the second rotating shaft 44. Rotating the second support plate 30 can drive the second support plate 30 to rotate relative to the first support plate 20.

The second support plate 30 is rotated counterclockwise ω1 to drive the second rotating shaft 44 to rotate counterclockwise ω1 relative to the first support plate 20, to drive the second fixing plate 422 to rotate counterclockwise ω1 relative to the first fixing plate 421, and the fourth fixing plate 432 rotates counterclockwise ω1 relative to the third fixing plate 431, to drive the second support plate 30 to rotate counterclockwise ω1 relative to the first support plate 20, so that the foldable holder 100 is in the open state (as shown in FIG. 3). When the foldable holder 100 is in the open state, the state of the clamping body 51 is the same as the state of the foldable holder 100 in the semi-unfolded state, the first clamping end 511 of the clamping body 51 is disengaged from the bump 412, and the second clamping end 512 is disengaged from the second clamping groove 441, and releases the second rotating shaft 44.

The second support plate 30 is rotated clockwise ω2, to drive the second rotating shaft 44 to rotate clockwise ω2 relative to the first support plate 20, to drive the second fixing plate 422 to rotate clockwise ω2 relative to the first fixing plate 421, and the fourth fixing plate 432 rotates clockwise ω2 relative to the third fixing plate 431, to drive the second support plate 30 to rotate clockwise ω2 relative to the first support plate 20 until the first support plate 20 is coplanar with the second support plate 30, so that the foldable holder 100 is in the semi-unfolded state shown in FIG. 2.

When the foldable holder 100 is in the semi-unfolded state, the first support plate 20 or the second support plate 30 is rotated clockwise ω2, so that the first shaft sleeve 22 rotates clockwise ω2 around the first rotating shaft 41, to drive the first support plate 20 to rotate clockwise ω2 around the first rotating shaft 41. That is, the first support plate 20 and the second support plate 30 rotate clockwise ω2 together relative to the bottom plate 10. In this case, the clamping portion 50 follows the first support plate 20 to rotate relative to the first rotating shaft 41, and the bump 412 abuts against the first clamping end 511, so that the clamping body 51 moves towards the second rotating shaft 44 until the second clamping end 512 is located in the second clamping groove 441 and clamps the second rotating shaft 44, so that the foldable holder 100 returns to the closed state shown in FIG. 1.

In this embodiment, a side surface of the bump 412 is a curved surface. When the foldable holder 100 is transformed from the semi-unfolded state to the closed state, the first support plate 20 is rotated clockwise ω2, the clamping portion 50 follows the first support plate 20 to rotate relative to the first rotating shaft 41, and the first clamping end 511 slides along the side surface of the bump 412 until it is opposite to the bump, so that the bump 412 abuts against the first clamping end.

Figure 14:
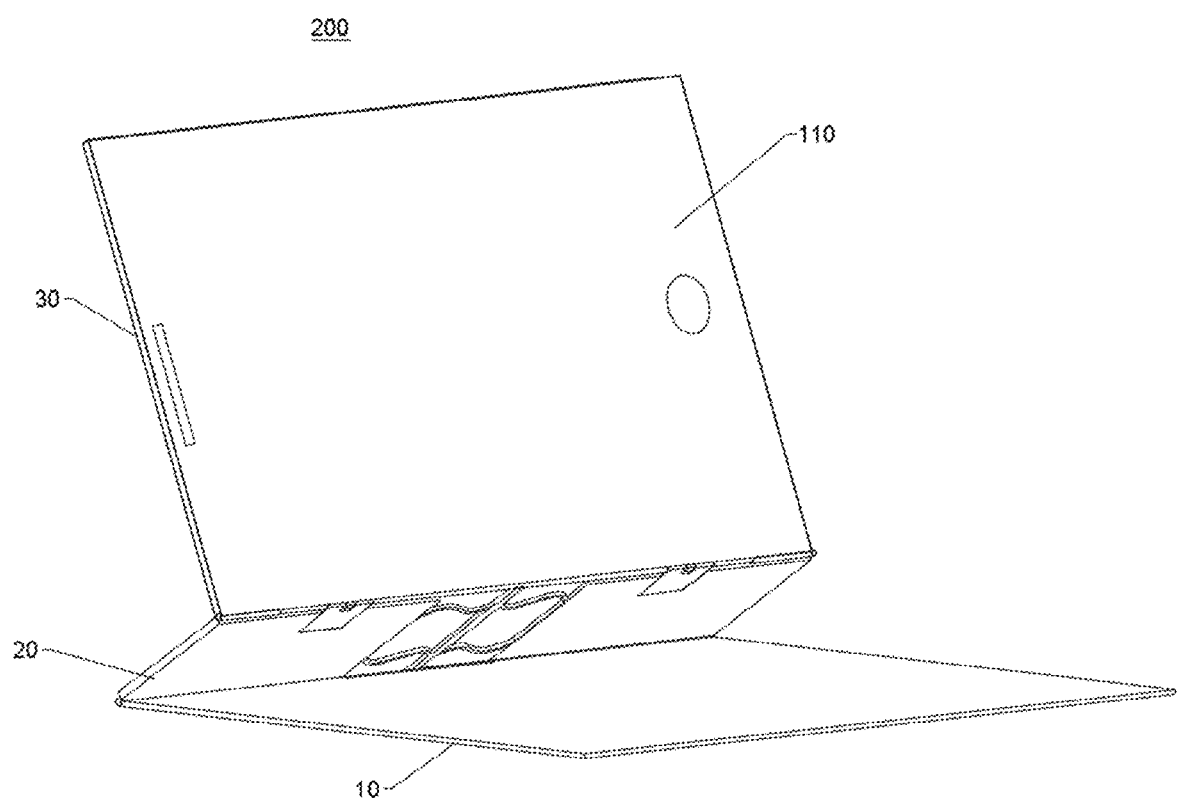
FIG. 14 is a schematic structural diagram of an electronic device according to this application.

Referring to FIG. 14, FIG. 14 is a schematic structural diagram of an electronic device 200 according to this application.

The electronic device 200 includes a mobile terminal 110 and the foregoing foldable holder 100. The mobile terminal 110 may be a tablet computer or a mobile phone. The mobile terminal 110 is mounted on the foldable holder 100, and specifically mounted on a third surface 311 of a second support plate 30 and connected to the second support plate 30. In this embodiment, the mobile terminal 110 may also be connected to the second support plate 30 in a magnetic attraction manner. In some other embodiments, the mobile terminal 110 may also be bonded to the second support plate 30, the mobile terminal 110 may be connected to the second support plate 30 by clamping, or the mobile terminal 110 may be screwed to the second support plate 30. Other connection manners are also possible, as long as the connection between the mobile terminal 110 and the second support plate 30 can be realized.

The mobile terminal 110 is further connected to a keyboard to realize signal transmission between the mobile terminal 110 and the keyboard. In this embodiment, the mobile terminal 110 is connected to the keyboard in a wireless manner, such as a Bluetooth connection or a wireless local area network connection. In other implementations, the mobile terminal 110 may also be connected to the keyboard in a wired manner.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A foldable holder, comprising:
a first support plate, a second support plate, a bottom plate, a first rotating portion, a second rotating portion, and a clamping portion, wherein the bottom plate is rotationally connected to the first support plate through the first rotating portion, and the second support plate is rotationally connected to a side of the first support plate through the second rotating portion; the first rotating portion and the second rotating portion are located on two opposite sides of the first support plate; the clamping portion is mounted on the first support plate, and slidable relative to the first support plate;
when the foldable holder is in a closed state, the first support plate and the second support plate are side by side and both are stacked on the bottom plate, the clamping portion clamps the second rotating portion to lock the first support plate and the second support plate, and the first support plate and the second support plate are rotatable together relative to the bottom plate, so that the first support plate is arranged at an angle to the bottom plate;
when the first support plate is at an angle to the bottom plate, the clamping portion is unlocked from the second rotating portion and clamped with the first rotating portion; and an unlocked state of the second rotating portion enables the second support plate to rotate relative to the first support plate, so that the foldable holder is in an open state;

when the foldable holder is in an open state, the second support plate is arranged at an angle to the first support plate.

2. The foldable holder according to claim 1, wherein a surface of the first support plate facing away from the bottom plate is an outer surface, when the first support plate is at an angle to the bottom plate, the second rotating portion is unlocked, the second support plate is reciprocally rotatable relative to the first support plate through the second rotating portion, the second support plate and the first support plate are located at a support angle, and the support angle is an angle between the second support plate and the outer surface.

3. The foldable holder according to claim 1, wherein the clamping portion comprises a clamping body and an elastic body, the clamping portion is mounted on the first support plate, the elastic body connects the clamping body and the first support plate, and the clamping body is slidable relative to the first support plate; and when the foldable holder is in the closed state, the elastic body is in a pre-compressed state, and the elastic body tends to open elastically towards the first rotating portion.

4. The foldable holder according to claim 3, wherein the clamping portion comprises two elastic bodies; the two elastic bodies are connected to two opposite sides of the clamping body, two ends of the clamping body face the first rotating portion and the second rotating portion respectively, and the elastic bodies are away from end portions of the clamping body and fixedly connected to the first support plate; and a pre-compression resilience force of the elastic body enables the clamping body to slide along the first support plate towards the first rotating portion so that the clamping body is clamped with the first rotating portion, and the clamping body is slidable along the first support plate towards the second rotating portion, so that the clamping body is clamped with the second rotating portion and the elastic body is compressed when the clamping body slides.

5. The foldable holder according to claim 4, wherein the first rotating portion comprises a first rotating shaft, the first rotating shaft is fixedly connected to the bottom plate and rotationally connected to the first support plate, the first support plate is rotatable around the first rotating shaft to drive the first support plate to rotate relative to the bottom plate, and when the clamping body is clamped with the first rotating shaft, the first support plate is located at an angle to the bottom plate.

6. The foldable holder according to claim 5, wherein the first rotating portion comprises a locking member, the locking member is mounted on the first rotating shaft, and when the first support plate is arranged at an angle to the bottom plate, the locking member locks the first rotating shaft, to locate the first support plate and the bottom plate.

7. The foldable holder according claim 6, wherein the first rotating portion comprises a bump, and the bump is fixedly connected to the first rotating shaft and opposite to an end of the clamping body facing the first rotating shaft; when the foldable holder is in the closed state, the bump abuts against the clamping body; and when the foldable holder is in the open state, or the first support plate is arranged at an angle to the bottom plate, the bump is disengaged from the clamping body.

8. The foldable holder according to claim 5, wherein the second rotating portion comprises a second rotating shaft, the second rotating shaft is fixedly connected to the second support plate and rotationally connected to the first support plate, and rotation of the second support plate drives the second rotating shaft to rotate relative to the first support plate, so that the second support plate rotates relative to the first support plate.

9. The foldable holder according to claim 8, wherein the clamping body clamps the second rotating shaft, and the first support plate is rotatable around the first rotating shaft; and the clamping body clamps the first rotating shaft and releases the second rotating shaft, and the second support plate drives the second rotating shaft to rotate relative to the first support plate.

10. The foldable holder according to claim 8, wherein the first rotating shaft is provided with a first clamping groove, and the first clamping groove is opposite to an end of the clamping body facing the first rotating shaft; when the foldable holder is in the closed state, the end of the clamping body facing the first rotating shaft is staggered with the first clamping groove; and when the foldable holder is in the open state, or the first support plate is arranged at an angle to the bottom plate, the end of the clamping body facing the first rotating shaft is clamped with the first clamping groove.

11. The foldable holder according to claim 10, wherein the second rotating shaft is provided with a second clamping groove, and when the foldable holder is in the closed state, an end of the clamping body facing the second rotating shaft is clamped with the second clamping groove; and when the foldable holder is in the open state, or the first support plate is arranged at an angle to the bottom plate, the end of the clamping body facing the second rotating shaft is disengaged from the second clamping groove and the second rotating shaft is released.

12. The foldable holder according to claim 8, wherein the second rotating portion comprises a hinge, and the hinge is connected between the first support plate and the second support plate and rotatable relative to the second rotating shaft; and when the first support plate is located at an angle to the bottom plate, the hinge supports the second support plate to the first support plate, to limit the second support plate to rotate towards the bottom plate.

13. The foldable holder according to claim 12, wherein the hinge further comprises a first fixing plate and a second fixing plate, the first fixing plate is fixedly connected to the first support plate, the second fixing plate is fixedly connected to the second support plate, the second rotating shaft is fixedly connected to the second fixing plate, and the first fixing plate is rotationally connected to the second rotating shaft; and the second support plate drives the second rotating shaft to rotate relative to the first fixing plate, to drive the second fixing plate to rotate relative to the first fixing plate, to further drive the second support plate to rotate relative to the first support plate.

14. The foldable holder according to claim 3, wherein the elastic body is a curved strip-shaped elastic sheet or a spring, and a length extension direction of the elastic body intersects with a sliding direction of the clamping body.

15. The foldable holder according to claim 3, wherein the first support plate comprises a surface, a mounting groove is recessed on the surface, the clamping portion is accommodated in the mounting groove, an end portion of the elastic body away from the clamping body is fixed with a groove side wall of the mounting groove, and the clamping body is slidable in the mounting groove to make the elastic body generate elastic deformation.

16. The foldable holder according to claim 1, wherein the foldable holder comprises a locating member, the locating member is mounted on the second rotating portion, the clamping portion is clamped with the first rotating portion, and the locating member is used for locating the second support plate relative to the first support plate.

17. An electronic device, comprising:
   a mobile terminal; and
   a foldable holder, wherein the mobile terminal is mounted on a second support plate of the foldable holder, the foldable holder comprising:
   a first support plate, a second support plate, a bottom plate, a first rotating portion, a second rotating portion, and a clamping portion, wherein the bottom plate is rotationally connected to the first support plate through the first rotating portion, and the second support plate is rotationally connected to a side of the first support plate through the second rotating portion; the first rotating portion and the second rotating portion are located on two opposite sides of the first support plate; the clamping portion is mounted on the first support plate, and slidable relative to the first support plate;
   when the foldable holder is in a closed state, the first support plate and the second support plate are side by side and both are stacked on the bottom plate, the clamping portion clamps the second rotating portion to lock the first support plate and the second support plate, and the first support plate and the second support plate are rotatable together relative to the bottom plate, so that the first support plate is arranged at an angle to the bottom plate:
   when the first support plate is at an angle to the bottom plate, the clamping portion is unlocked from the second rotating portion and clamped with the first rotating portion; and an unlocked state of the second rotating portion enables the second support plate to rotate relative to the first support plate, so that the foldable holder is in an open state;
   when the foldable holder is in an open state, the second support plate is arranged at an angle to the first support plate.

18. The electronic device according to claim 17, wherein a surface of the first support plate facing away from the bottom plate is an outer surface, when the first support plate is at an angle to the bottom plate, the second rotating portion is unlocked, the second support plate is reciprocally rotatable relative to the first support plate through the second rotating portion, the second support plate and the first support plate are located at a support angle, and the support angle is an angle between the second support plate and the outer surface.

19. The foldable holder according to claim 17, wherein the clamping portion comprises a clamping body and an elastic body, the clamping portion is mounted on the first support plate, the elastic body connects the clamping body and the first support plate, and the clamping body is slidable relative to the first support plate; and when the foldable holder is in the closed state, the elastic body is in a pre-compressed state, and the elastic body tends to open elastically towards the first rotating portion.

20. The electronic device according to claim 19, wherein the clamping portion comprises two elastic bodies; the two elastic bodies are connected to two opposite sides of the clamping body, two ends of the clamping body face the first rotating portion and the second rotating portion respectively, and the elastic bodies are away from end portions of the clamping body and fixedly connected to the first support plate; and a pre-compression resilience force of the elastic body enables the clamping body to slide along the first support plate towards the first rotating portion so that the clamping body is clamped with the first rotating portion, and the clamping body is slidable along the first support plate towards the second rotating portion, so that the clamping body is clamped with the second rotating portion and the elastic body is compressed when the clamping body slides.

* * * * *